US011400613B2

(12) United States Patent
Hofmann et al.

(10) Patent No.: US 11,400,613 B2
(45) Date of Patent: Aug. 2, 2022

(54) SELF-HAMMERING CUTTING TOOL

(71) Applicant: California Institute of Technology, Pasadena, CA (US)

(72) Inventors: Douglas C. Hofmann, Altadena, CA (US); Morgan Hendry, Pasadena, CA (US); Samad A. Firdosy, Pasadena, CA (US); Andre M. Pate, Pasadena, CA (US); Christopher R. Yahnker, Pasadena, CA (US); Cecily M. Sunday, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 156 days.

(21) Appl. No.: 16/806,799

(22) Filed: Mar. 2, 2020

(65) Prior Publication Data
US 2020/0282582 A1 Sep. 10, 2020

Related U.S. Application Data

(60) Provisional application No. 62/812,555, filed on Mar. 1, 2019.

(51) Int. Cl.
*B26D 1/00* (2006.01)
*B23B 27/16* (2006.01)
(Continued)

(52) U.S. Cl.
CPC ............ *B26D 1/0006* (2013.01); *B23B 27/16* (2013.01); *B23D 57/02* (2013.01); *B23D 61/028* (2013.01);
(Continued)

(58) Field of Classification Search
CPC .. B26D 1/006; B26D 1/146; B26D 2001/002; B26D 2001/006; B23D 61/028;
(Continued)

(56) References Cited

U.S. PATENT DOCUMENTS 2,190,492 A * 2/1940 Staples ................. B23D 77/08
408/156
3,435,512 A   4/1969 Macrobbie
(Continued)

FOREIGN PATENT DOCUMENTS

CN     101709773 A     5/2010
CN     102563006 A     7/2012
(Continued)

OTHER PUBLICATIONS

Extended European Search Report for European Application No. 18806700.3, Search completed Oct. 20, 2020, dated Oct. 28, 2020, 7 Pgs.
(Continued)

*Primary Examiner* — Ghassem Alie
(74) *Attorney, Agent, or Firm* — KPPB LLP

(57) ABSTRACT

A cutting tool with a plurality of cutting elements connected to a support structure wherein a portion of the support structure is configured to flex or bend based on the rotational frequency of the cutting tool. The rotational frequency of the cutting tool is a product of the design and composition of the tool.

23 Claims, 13 Drawing Sheets

(51) Int. Cl.
  *B23D 61/02* (2006.01)
  *E21C 25/16* (2006.01)
  *E21B 10/02* (2006.01)
  *E21B 10/08* (2006.01)
  *B23D 57/02* (2006.01)

(52) U.S. Cl.
  CPC ........ *B26D 2001/002* (2013.01); *E21B 10/02* (2013.01); *E21B 10/08* (2013.01); *E21C 25/16* (2013.01)

(58) Field of Classification Search
  CPC ...... B23D 61/04; B23D 51/02; B23D 61/025; B23D 57/02; B23B 27/16; B23B 2226/75; B23B 2260/136; B23B 51/0413; B28D 1/041; B28D 1/124; B28D 1/121; B25D 17/02; E21B 10/08; E21B 4/06; E21B 10/43; E21B 10/02; E21C 25/16
  USPC ....... 83/522.14, 676, 835; 408/16, 196, 213, 408/233, 713, 197, 198, 231, 227, 201
  See application file for complete search history.

(56) References Cited

U.S. PATENT DOCUMENTS

| | | |
|---|---|---|
| 3,529,457 A | 9/1970 | Bowers |
| 3,682,606 A | 8/1972 | Anderson et al. |
| 3,986,412 A | 10/1976 | Farley et al. |
| 4,123,737 A | 10/1978 | Hoagland, Jr. |
| RE29,989 E | 5/1979 | Polk |
| 4,173,393 A | 11/1979 | Maurer |
| 4,202,404 A | 5/1980 | Carlson |
| 4,662,259 A * | 5/1987 | Dutina ................. B23D 61/023 83/837 |
| 4,711,795 A | 12/1987 | Takeuchi et al. |
| 4,749,625 A | 6/1988 | Obayashi et al. |
| 4,810,314 A | 3/1989 | Henderson et al. |
| 4,812,150 A | 3/1989 | Scott |
| 4,823,638 A | 4/1989 | Ishikawa |
| 4,851,296 A | 7/1989 | Tenhover et al. |
| 4,883,632 A | 11/1989 | Goto et al. |
| 4,935,291 A | 6/1990 | Gunnink |
| 5,168,918 A | 12/1992 | Okuda et al. |
| 5,288,344 A | 2/1994 | Peker et al. |
| 5,310,432 A | 5/1994 | Yamanaka et al. |
| 5,485,761 A | 1/1996 | Rouverol |
| 5,509,978 A | 4/1996 | Masumoto et al. |
| 5,636,550 A | 6/1997 | Deane |
| 5,722,295 A | 3/1998 | Sakai et al. |
| 5,746,844 A | 5/1998 | Sterett et al. |
| 5,772,803 A | 6/1998 | Peker et al. |
| 5,866,272 A | 2/1999 | Westre et al. |
| 5,896,642 A | 4/1999 | Peker et al. |
| 5,985,204 A | 11/1999 | Otsuka et al. |
| 6,162,130 A | 12/2000 | Masumoto et al. |
| 6,273,322 B1 | 8/2001 | Yamamoto et al. |
| 6,321,738 B1 * | 11/2001 | Walsh .................... B28D 1/121 83/676 |
| 6,620,264 B2 | 9/2003 | Kundig et al. |
| 6,652,679 B1 | 11/2003 | Inoue et al. |
| 6,771,490 B2 | 8/2004 | Peker et al. |
| 6,843,496 B2 | 1/2005 | Peker et al. |
| 6,887,586 B2 | 5/2005 | Peker et al. |
| 7,052,561 B2 | 5/2006 | Lu et al. |
| 7,073,560 B2 | 7/2006 | Kang et al. |
| 7,075,209 B2 | 7/2006 | Howell et al. |
| 7,357,731 B2 | 4/2008 | Johnson et al. |
| 7,360,419 B2 | 4/2008 | French et al. |
| 7,497,981 B2 | 3/2009 | Graham et al. |
| 7,500,987 B2 | 3/2009 | Bassler et al. |
| 7,540,929 B2 | 6/2009 | Demetriou et al. |
| 7,552,664 B2 | 6/2009 | Bulatowicz |
| 7,862,323 B2 | 1/2011 | Micarelli et al. |
| 7,883,592 B2 | 2/2011 | Hofmann et al. |
| 7,896,982 B2 | 3/2011 | Johnson et al. |
| 7,955,713 B2 | 6/2011 | Roebroeks et al. |
| 8,042,770 B2 | 10/2011 | Martin et al. |
| 8,400,721 B2 | 3/2013 | Bertele et al. |
| 8,418,366 B2 | 4/2013 | Wang et al. |
| 8,485,245 B1 | 7/2013 | Prest et al. |
| 8,596,106 B2 | 12/2013 | Tang et al. |
| 8,613,815 B2 | 12/2013 | Johnson et al. |
| 8,639,484 B2 | 1/2014 | Wei et al. |
| 8,789,629 B2 | 7/2014 | Parness et al. |
| 8,986,469 B2 | 3/2015 | Khalifa et al. |
| 9,057,120 B2 | 6/2015 | Pham et al. |
| 9,211,564 B2 | 12/2015 | Hofmann |
| 9,328,813 B2 | 5/2016 | Hofmann et al. |
| 9,610,650 B2 | 4/2017 | Hofmann et al. |
| 9,783,877 B2 | 10/2017 | Hofmann et al. |
| 9,791,032 B2 | 10/2017 | Hofmann et al. |
| 9,868,150 B2 | 1/2018 | Hofmann et al. |
| 10,081,136 B2 | 9/2018 | Hofmann et al. |
| 10,151,377 B2 | 12/2018 | Hofmann et al. |
| 10,155,412 B2 | 12/2018 | Parness et al. |
| 10,174,780 B2 | 1/2019 | Hofmann et al. |
| 10,471,652 B2 | 11/2019 | Hofmann et al. |
| 11,123,797 B2 | 9/2021 | Hofmann |
| 11,185,921 B2 | 11/2021 | Hofmann et al. |
| 11,198,181 B2 | 12/2021 | Hofmann et al. |
| 2002/0053375 A1 | 5/2002 | Hays et al. |
| 2002/0100573 A1 | 8/2002 | Inoue et al. |
| 2002/0184766 A1 | 12/2002 | Kobayashi et al. |
| 2003/0052105 A1 | 3/2003 | Nagano et al. |
| 2003/0062811 A1 | 4/2003 | Peker et al. |
| 2003/0209125 A1 * | 11/2003 | Bertolet ................. B28D 1/121 83/835 |
| 2004/0035502 A1 | 2/2004 | Kang et al. |
| 2004/0103536 A1 | 6/2004 | Kobayashi et al. |
| 2004/0103537 A1 | 6/2004 | Kobayashi et al. |
| 2004/0154701 A1 | 8/2004 | Lu et al. |
| 2005/0034792 A1 | 2/2005 | Lu et al. |
| 2005/0127139 A1 | 6/2005 | Slattery et al. |
| 2005/0172777 A1 * | 8/2005 | Olander ............... B26D 7/2621 83/835 |
| 2005/0263932 A1 | 12/2005 | Heugel |
| 2006/0105011 A1 | 5/2006 | Sun et al. |
| 2006/0130944 A1 | 6/2006 | Poon et al. |
| 2006/0156785 A1 | 7/2006 | Mankame et al. |
| 2007/0034304 A1 | 2/2007 | Inoue et al. |
| 2007/0226979 A1 | 10/2007 | Paton et al. |
| 2007/0228592 A1 | 10/2007 | Dunn et al. |
| 2007/0253856 A1 | 11/2007 | Vecchio et al. |
| 2007/0266841 A1 * | 11/2007 | Robinson ............. B23D 61/025 83/835 |
| 2008/0085368 A1 | 4/2008 | Gauthier et al. |
| 2008/0121316 A1 | 5/2008 | Duan et al. |
| 2008/0190521 A1 | 8/2008 | Loffler et al. |
| 2008/0304975 A1 | 12/2008 | Clark et al. |
| 2009/0011846 A1 | 1/2009 | Scott |
| 2009/0114317 A1 | 5/2009 | Collier et al. |
| 2009/0194205 A1 | 8/2009 | Loffler et al. |
| 2009/0263582 A1 | 10/2009 | Batchelder |
| 2009/0277540 A1 | 11/2009 | Langlet |
| 2009/0288741 A1 | 11/2009 | Zhang et al. |
| 2010/0313704 A1 | 12/2010 | Wang et al. |
| 2011/0048587 A1 | 3/2011 | Vecchio et al. |
| 2011/0154928 A1 | 6/2011 | Ishikawa |
| 2011/0165339 A1 | 7/2011 | Skoglund et al. |
| 2011/0302783 A1 | 12/2011 | Nagata et al. |
| 2012/0067100 A1 | 3/2012 | Stefansson et al. |
| 2012/0073710 A1 | 3/2012 | Kim et al. |
| 2012/0077052 A1 | 3/2012 | Demetriou et al. |
| 2012/0132631 A1 | 5/2012 | Wescott et al. |
| 2012/0133080 A1 | 5/2012 | Moussa et al. |
| 2012/0289946 A1 | 11/2012 | Steger |
| 2013/0009338 A1 | 1/2013 | Mayer |
| 2013/0039708 A1 * | 2/2013 | Stenman ................ B28D 1/041 408/196 |
| 2013/0048152 A1 | 2/2013 | Na et al. |
| 2013/0062134 A1 | 3/2013 | Parness et al. |
| 2013/0112321 A1 | 5/2013 | Poole et al. |
| 2013/0133787 A1 | 5/2013 | Kim |

(56) References Cited

U.S. PATENT DOCUMENTS

| | | |
|---|---|---|
| 2013/0139964 A1 | 6/2013 | Hofmann et al. |
| 2013/0143060 A1 | 6/2013 | Jacobsen et al. |
| 2013/0255837 A1 | 10/2013 | Peker et al. |
| 2013/0277891 A1 | 10/2013 | Teulet |
| 2013/0280547 A1 | 10/2013 | Brandl et al. |
| 2013/0309121 A1 | 11/2013 | Prest et al. |
| 2013/0333814 A1 | 12/2013 | Fleury et al. |
| 2014/0004352 A1 | 1/2014 | McCrea et al. |
| 2014/0020794 A1 | 1/2014 | Hofmann et al. |
| 2014/0030948 A1 | 1/2014 | Kim et al. |
| 2014/0045680 A1 | 2/2014 | Nakayama et al. |
| 2014/0048969 A1 | 2/2014 | Swanson et al. |
| 2014/0070445 A1 | 3/2014 | Mayer |
| 2014/0083640 A1 | 3/2014 | Waniuk et al. |
| 2014/0090752 A1 | 4/2014 | Waniuk et al. |
| 2014/0093674 A1 | 4/2014 | Hofmann et al. |
| 2014/0141164 A1 | 5/2014 | Hofmann |
| 2014/0163717 A1 | 6/2014 | Das et al. |
| 2014/0202595 A1 | 7/2014 | Hofmann |
| 2014/0213384 A1 | 7/2014 | Johnson et al. |
| 2014/0224050 A1 | 8/2014 | Hofmann et al. |
| 2014/0227125 A1 | 8/2014 | Hofmann |
| 2014/0246809 A1 | 9/2014 | Hofmann |
| 2014/0293384 A1 | 10/2014 | O'keeffe et al. |
| 2014/0312098 A1 | 10/2014 | Hofmann et al. |
| 2014/0334106 A1 | 11/2014 | Prest et al. |
| 2014/0342179 A1 | 11/2014 | Hofmann et al. |
| 2014/0348571 A1 | 11/2014 | Prest et al. |
| 2015/0014885 A1 | 1/2015 | Hofmann et al. |
| 2015/0047463 A1 | 2/2015 | Hofmann et al. |
| 2015/0068648 A1 | 3/2015 | Schroers et al. |
| 2015/0075744 A1 | 3/2015 | Hofmann et al. |
| 2015/0165693 A1 | 6/2015 | Sagoo et al. |
| 2015/0209094 A1 | 7/2015 | Anderson |
| 2015/0209889 A1 | 7/2015 | Peters et al. |
| 2015/0219572 A1 | 8/2015 | Beuth, Jr. et al. |
| 2015/0289605 A1 | 10/2015 | Prest et al. |
| 2015/0298443 A1 | 10/2015 | Hundley et al. |
| 2015/0299825 A1 | 10/2015 | Poole et al. |
| 2015/0314566 A1 | 11/2015 | Mattlin et al. |
| 2015/0323053 A1 | 11/2015 | El-Wardany et al. |
| 2015/0352794 A1 | 12/2015 | Nguyen et al. |
| 2016/0023438 A1 | 1/2016 | Johnson et al. |
| 2016/0175929 A1 | 6/2016 | Colin et al. |
| 2016/0178047 A1 | 6/2016 | Kennett et al. |
| 2016/0186850 A1 | 6/2016 | Hofmann et al. |
| 2016/0233089 A1 | 8/2016 | Zenou et al. |
| 2016/0258522 A1 | 9/2016 | Hofmann et al. |
| 2016/0263937 A1 | 9/2016 | Parness et al. |
| 2016/0265576 A1 | 9/2016 | Hofmann et al. |
| 2016/0299183 A1 | 11/2016 | Lee |
| 2016/0361765 A1 | 12/2016 | Danger et al. |
| 2016/0361897 A1 | 12/2016 | Hofmann et al. |
| 2017/0021417 A1 | 1/2017 | Martin et al. |
| 2017/0050241 A1 | 2/2017 | Thomas et al. |
| 2017/0121799 A1 | 5/2017 | Hofmann et al. |
| 2017/0137955 A1 | 5/2017 | Hofmann et al. |
| 2017/0211168 A1 | 7/2017 | Liu et al. |
| 2017/0226811 A1 | 8/2017 | Hofmann et al. |
| 2017/0305003 A1* | 10/2017 | Tannhaeuser .............. B64F 5/40 |
| 2018/0119259 A1 | 5/2018 | Hofmann et al. |
| 2018/0257141 A1 | 9/2018 | Hofmann et al. |
| 2018/0272432 A1 | 9/2018 | Jonsson et al. |
| 2018/0339338 A1 | 11/2018 | Hofmann et al. |
| 2018/0339342 A1 | 11/2018 | Hofmann |
| 2018/0345366 A1 | 12/2018 | Hofmann |
| 2019/0009464 A1 | 1/2019 | Steege |
| 2019/0022923 A1 | 1/2019 | Hofmann et al. |
| 2019/0126674 A1 | 5/2019 | Parness et al. |
| 2019/0154130 A1 | 5/2019 | Hofmann et al. |
| 2019/0170235 A1 | 6/2019 | Hofmann et al. |
| 2019/0177826 A1 | 6/2019 | Hofmann et al. |
| 2019/0195269 A1 | 6/2019 | Hofmann et al. |
| 2019/0255635 A1 | 8/2019 | Hanni et al. |
| 2019/0314903 A1 | 10/2019 | Haenle et al. |
| 2020/0284146 A1 | 9/2020 | Yahnker et al. |
| 2021/0379661 A1 | 12/2021 | Hofmann |
| 2022/0055114 A1 | 2/2022 | Hofmann et al. |

FOREIGN PATENT DOCUMENTS

| | | |
|---|---|---|
| CN | 103153502 A | 6/2013 |
| CN | 203227820 U | 10/2013 |
| DE | 102010062089 A1 | 5/2012 |
| DE | 112018001284 T5 | 11/2019 |
| EP | 0127366 A1 | 5/1984 |
| EP | 1063312 A1 | 12/2000 |
| EP | 1138798 A1 | 10/2001 |
| EP | 1696153 A1 | 8/2006 |
| EP | 1404884 B1 | 7/2007 |
| EP | 1944138 A2 | 7/2008 |
| EP | 3630395 A1 | 4/2020 |
| EP | 3630397 A2 | 4/2020 |
| JP | 61276762 A | 12/1986 |
| JP | 09121094 A | 5/1997 |
| JP | 2002045960 A | 2/2002 |
| JP | 2004315340 A | 11/2004 |
| JP | 2004353053 A | 12/2004 |
| JP | 2007040517 A | 2/2007 |
| JP | 2007040518 A | 2/2007 |
| JP | 2007247037 A | 9/2007 |
| JP | 2008115932 A | 5/2008 |
| JP | 2008264865 A | 11/2008 |
| JP | 2011045931 A | 3/2011 |
| JP | 2012046826 A | 3/2012 |
| JP | 2012162805 A | 8/2012 |
| JP | 2013057397 A | 3/2013 |
| JP | 5249932 B2 | 7/2013 |
| JP | 2013238278 A | 11/2013 |
| JP | 2018149655 A | 9/2018 |
| KR | 101420176 B1 | 7/2014 |
| KR | 1020190119154 A | 10/2019 |
| KR | 10-2020-0004435 A | 1/2020 |
| WO | 2006073428 A2 | 7/2006 |
| WO | 2007033882 A1 | 4/2007 |
| WO | 2008058896 A1 | 5/2008 |
| WO | 2008156889 A2 | 12/2008 |
| WO | 2009069716 A1 | 6/2009 |
| WO | 2010027317 A1 | 3/2010 |
| WO | 2011159596 A1 | 12/2011 |
| WO | 2012031022 A2 | 3/2012 |
| WO | 2012083922 A1 | 6/2012 |
| WO | 2012147559 A1 | 11/2012 |
| WO | 2013138710 A1 | 9/2013 |
| WO | 2013141878 A1 | 9/2013 |
| WO | 2013141882 A1 | 9/2013 |
| WO | 2014004704 A1 | 1/2014 |
| WO | 2014012113 A2 | 1/2014 |
| WO | 2014058498 A3 | 4/2014 |
| WO | 2015042437 A1 | 3/2015 |
| WO | 2015156797 A1 | 10/2015 |
| WO | 2016116562 A1 | 7/2016 |
| WO | 2018165662 A1 | 9/2018 |
| WO | 2018218077 A1 | 11/2018 |
| WO | 2018218247 A1 | 11/2018 |
| WO | 2018223117 A2 | 12/2018 |
| WO | 2018223117 A3 | 1/2019 |

OTHER PUBLICATIONS

Extended European Search Report for European Application No. 18809486.6, Search completed Sep. 30, 2030, dated Oct. 12, 2020, 7 Pgs.

Qiao et al., "Metallic Glass Matrix Composites", Materials Science and Engineering, Feb. 2016, vol. 100, pp. 1-69, http://dx.doi.org.10.10163/jmser.2015.12.001.

Whang et al., "Microstructures and age hardening of rapidly quenched Ti—Zr—Si alloys", Journal of Materials Science Letters, 1985, vol. 4, pp. 883-887.

Kobayashi et al., "Fe-based metallic glass coatings produced by smart plasma spraying process", Materials Science and Engineering B, vol. B148, No. 1-3, Feb. 25, 2008, pp. 110-113.

(56) References Cited

OTHER PUBLICATIONS

Kobayashi et al., "Mechanical property of Fe-base metallic glass coating formed by gas tunnel type plasma spraying", Surface & Coatings Technology, vol. 202, No. 12, Mar. 15, 2008, 6 pgs.

Kobayashi et al., "Property of Ni-Based Metallic Glass Coating Produced by Gas Tunnel Type Plasma Spraying", International Plasma Chemistry Society, ISPC 20, 234, Philadelphia, USA, Retrieved from: http://www.ispc-conference.org/ispcproc/ispc20/234.pdf, Jul. 24, 2011, 4 pgs.

Kong et al., "Effect of Flash Temperature on Tribological Properties of Bulk Metallic Glasses", Tribology Letters, vol. 35, Apr. 25, 2009, pp. 151-158.

Kozachkov et al., "Effect of cooling rate on the volume fraction of B2 phases in a CuZrAlCo metallic glass matrix composite", Intermetallics, vol. 39, Aug. 2013, pp. 89-93.

Kuhn et al., "Microstructure and mechanical properties of slowly cooled Zr—Nb—Cu—Ni—Al composites with ductile bcc phase", Materials Science and Engineering: A, vol. 375-377, Jul. 2004, pp. 322-326.

Kuhn et al., "ZrNbCuNiAl bulk metallic glass matrix composites containing dendritic bcc phase precipitates", Applied Physics Letters, vol. 80, No. 14, Apr. 8, 2002, pp. 2478-2480.

Kumar et al., "Bulk Metallic Glass: The Smaller the Better", Advanced Materials, vol. 23, No. 4, 2011, pp. 461-476.

Kumar et al., "Embrittlement of Zr-based Bulk Metallic Glasses", Acta Materialia, vol. 57, 2009, pp. 3572-3583.

Kwon et al., "Wear behavior of Fe-based bulk metallic glass composites", Journal of Alloys and Compounds, vol. 509S, Jun. 2011, pp. S105-S108.

Launey et al., "Fracture toughness and crack-resistance curve behavior in metallic glass-matrix composites", Applied Physics Letters, vol. 94, Jun. 18, 2009, pp. 241910-1-241910-3.

Launey et al., "Solution to the problem of the poor cyclic fatigue resistance of bulk metallic glasses", PNAS Early Edition, Mar. 31, 2009, pp. 1-6.

Lee et al., "Effect of a controlled volume fraction of dendritic phases on tensile and compressive ductility in La-based metallic glass matrix composites", Acta Materialia, vol. 52, No. 14, Aug. 2004, pp. 4121-4131.

Lee et al., "Nanomechanical properties of embedded dendrite phase and its influence on inelastic deformation of Zr55Al10Ni5Cu30 glassy alloy", Materials Science and Engineering A, vol. 449-451, Mar. 25, 2007, pp. 945-948.

Li et al., "Selective laser melting of Zr-based bulk metallic glasses: Processing, microstructure and mechanical properties", Materials and Design, vol. 112, Sep. 21, 2016, pp. 217-226.

Li et al., "Wear behavior of bulk Zr41Ti14Cu12.5Ni10Be22.5 metallic glasses", Journal of Materials Research, vol. 17, No. 8, Aug. 2002, pp. 1877-1880.

Lillo et al., "Microstructure, Processing, Performance Relationships for High Temperature Coatings", U.S. Department of Energy, Office of Fossil Energy, under DOE Idaho Operations Office, Contract DE-AC07-05ID14517, 22nd Annual Conference on Fossil Energy Materials, Pittsburgh, U.S., Jul. 2008, 8 pgs.

Lin et al., "Designing a toxic-element-free Ti-based amorphous alloy with Yemarkable supercooled liquid region for biomedical application", Intermetallics, vol. 55, Dec. 2014, pp. 22-27.

List et al., "Impact Conditions for Cold Spraying of Hard Metallic Glasses", Journal of Thermal Spray Technology, vol. 21, No. 3-4, Jun. 2012, pp. 531-540.

Liu et al., "Influence of Heat Treatment on Microstructure and Sliding Wear of Thermally Sprayed Fe-Based Metallic Glass coatings", Tribology Letters, vol. 46, Mar. 4, 2012, pp. 131-138.

Liu et al., "Metallic glass coating on metals plate by adjusted explosive welding technique", Applied Surface Science, vol. 255, No. 23, Sep. 15, 2009, pp. 9343-9347.

Liu et al., "Microstructure and properties of Fe-based amorphous metallic coating produced by high velocity axial plasma spraying", Journal of Alloys and Compounds, vol. 484, No. 1-2, Sep. 18, 2009, pp. 300-307.

Liu et al., "Sliding Tribological Characteristics of a Zr-based Bulk Metallic Glass Near the Glass Transition Temperature", Tribology Letters, vol. 33, 2009, pp. 205-210.

Liu et al., "Wear behavior of a Zr-based bulk metallic glass and its composites", Journal of Alloys and Compounds, vol. 503, No. 1, Jul. 30, 2010, pp. 138-144.

Lu et al., "Crystallization Prediction on Laser Three-Dimensional Printing of Zr-based Bulk Metallic Glass", Journal of Non-Crystalline Solids, vol. 461, 2017, pp. 12-17.

Lupoi et al., "Deposition of metallic coatings on polymer surfaces using cold spray", Surface & Coatings Technology, vol. 205, No. 7, Dec. 25, 2010, pp. 2167-2173.

Ma et al., "Wear resistance of Zr-based bulk metallic glass applied in bearing rollers", Materials Science and Engineering A, vol. 386, No. 1-2, Nov. 25, 2004, pp. 326-330.

Maddala et al., "Effect of notch toughness and hardness on sliding wear of Cu50Hf41.5Al8.5 bulk metallic glass", Scripta Materialia, vol. 65, No. 7, Oct. 2011, pp. 630-633.

Madge, "Toughness of Bulk Metallic Glasses", Metals, vol. 5, pp. Jul. 17, 2015, 1279-1305.

Mahbooba et al., "Additive manufacturing of an iron-based bulk metallic glass larger than the critical casting thickness", Applied Materials Today, vol. 11, Jun. 2018, pp. 264-269.

Narayan et al., "On the hardness and elastic modulus of bulk metallic glass matrix composites", Scripta Materialia, vol. 63, No. 7, Oct. 2010, pp. 768-771.

Ni et al., "High performance amorphous steel coating prepared by HVOF thermal spraying", Journal of Alloys and Compounds, vol. 467, No. 1-2, Jan. 7, 2009, pp. 163-167.

Nishiyama et al., "Recent progress of bulk metallic glasses for strain-sensing devices", Materials Science and Engineering A, vol. 449-451, Mar. 25, 2007, pp. 79-83.

Oh et al., "Microstructure and tensile properties of high-strength high-ductility Ti-based amorphous matrix composites containing ductile dendrites", Acta Materialia, vol. 59, No. 19, Nov. 2011, pp. 7277-7286.

Parlar et al., "Sliding tribological characteristics of Zr-based bulk metallic glass", Intermetallics, vol. 16, No. 1, Jan. 2008, pp. 34-41.

Pauly et al., "Modeling deformation behavior of Cu—Zr—Al bulk metallic glass matrix composites", Applied Physics Letters, vol. 95, No. 10, 2009, pp. 101906-1-101906-3.

Pauly et al., "Processing Metallic Glasses by Selective Laser Melting", Materials Today, vol. 16, Jan./Feb. 2013, pp. 37-41.

Pauly et al., "Transformation-mediated ductility in CuZr-based bulk metallic glasses", Nature Materials, vol. 9, No. 6, May 16, 2010, 5 pgs.

Ponnambalam et al., "Fe-based bulk metallic glasses with diameter thickness larger than one centimeter", Journal of Materials Research, vol. 19, No. 5, May 2004, pp. 1320-1323.

Porter et al., "Incorporation of Amorphous Metals into MEMS for High Performance and Reliability", Rockwell Scientific Company, Final Report, Nov. 2003, 40 pgs.

Prakash et al., "Sliding wear behaviour of some Fe-, Co- and Ni-based metallic glasses during rubbing against bearing steel", Tribology Letters, vol. 8, Mar. 2000, pp. 153-160.

Qiao et al., "Development of plastic Ti-based bulk-metallic-glass-matrix composites by controlling the microstructures", Materials Science and Engineering A, vol. 527, No. 29-30, Nov. 15, 2010, pp. 7752-7756.

Ramamurty et al., "Hardness and plastic deformation in a bulk metallic glass", Acta Materialia, vol. 53, No. 3, Feb. 2005, pp. 705-717.

Revesz et al., "Microstructure and morphology of Cu—Zr—Ti coatings produced by thermal spray and treated by surface mechanical attrition", Journal of Alloys and Compounds, vol. 509S, Jun. 2011, pp. S482-S485.

Rigney et al., "The Evolution of Tribomaterial During Sliding: A Brief Introduction", Tribology Letters, vol. 39, Jul. 2010, pp. 3-7.

Roberts et al., "Cryogenic Charpy impact testing of metallic glass matrix composites", Scripta Materialia, vol. 66, No. 5, Nov. 11, 2011, 4 pgs.

Sanders et al., "Stability of Al-rich glasses in the Al—La—Ni system", Intermetallics, vol. 14, No. 3, Mar. 2006, pp. 348-351.

(56) References Cited

OTHER PUBLICATIONS

Schuh et al., "A survey of instrumented indentation studies on metallic glasses", Journal of Materials Research, vol. 19, No. 1, Jan. 2004, pp. 46-57.
Segu et al., "Dry Sliding Tribological Properties of Fe-Based Bulk Metallic Glass", Tribology Letters, vol. 47, Apr. 28, 2012, pp. 131-138.
Shen et al., "3D printing of large, complex metallic glass structures", Materials and Design, vol. 117, Mar. 2017, pp. 213-222.
Shen et al., "Exceptionally high glass-forming ability of an FeCoCrMoCBY alloy", Applied Physics, vol. 86, No. 15, 2005, pp. 151907-1-151907-3.
Extended European Search Report for European Application No. 14889035.3, Search completed Dec. 4, 2017, dated Dec. 13, 2017, 10 Pgs.
International Preliminary Report on Patentability for International Application PCT/US2018/035813, Report dated Dec. 3, 2019, dated Dec. 12, 2019, 9 Pgs.
International Preliminary Report on Patentability for International Application PCT/US2013/047950, Report dated Dec. 31, 2014, dated Jan. 8, 2015, 7 Pgs.
International Preliminary Report on Patentability for International Application PCT/US2013/050614, Report dated Jan. 20, 2015, dated Jan. 29, 2015, 9 Pgs.
International Preliminary Report on Patentability for International Application PCT/US2014/033510, Report dated Oct. 12, 2016, dated Oct. 20, 2016, 9 Pgs.
International Preliminary Report on Patentability for International Application PCT/US2014/056615, Report dated Mar. 22, 2016, dated Mar. 31, 2016, 11 Pgs.
International Preliminary Report on Patentability for International Application PCT/US2018/022020, Report dated Sep. 10, 2019, dated Sep. 19, 2019, 10 Pgs.
International Preliminary Report on Patentability for International Application PCT/US2018/034481, Report dated Nov. 26, 2019, dated Dec. 5, 2019, 17 Pgs.
International Preliminary Report on Patentability for International Application PCT/US2018/034924, Report dated Nov. 26, 2019, dated Dec. 5, 2019, 13 Pgs.
International Search Report and Written Opinion for International Application No. PCT/US2013/050614, Completed May 7, 2014, dated May 7, 2014, 12 pgs.
International Search Report and Written Opinion for International Application No. PCT/US2018/022020, Search completed Jul. 2, 2018, dated Jul. 3, 2018, 12 Pgs.
International Search Report and Written Opinion for International Application No. PCT/US2018/034481, Search completed Sep. 10, 2018, dated Sep. 10, 2018, 19 Pgs.
International Search Report and Written Opinion for International Application No. PCT/US2018/034924, Search completed Sep. 18, 2018, dated Sep. 19, 2018, 15 Pgs.
International Search Report and Written Opinion for International Application No. PCT/US2018/035813, Search completed Dec. 12, 2018, dated Dec. 12, 2018, 11 Pgs.
International Search Report and Written Opinion for International Application PCT/US2013/047950, Search completed Oct. 8, 2013, dated Oct. 10, 2013, 9 pgs.
International Search Report and Written Opinion for International Application PCT/US2014/033510, Search completed Jan. 8, 2015, dated Jan. 8, 2015, 11 Pgs.
International Search Report and Written Opinion for International Application PCT/US2014/056615, Search completed Dec. 29, 2014, dated Dec. 30, 2014, 13 Pgs.
"Corrosion of Titanium and Titanium Alloys", Total Materia, printed Feb. 16, 2016 from http://www.totalmateria.com/Article24.htm, published Sep. 2001, 4 pgs.
"Gear", Dictionary.com. Accessed Aug. 30, 2016, 2 pgs.
"Group 4 element", Wikipedia. https://en.wikipedia.org/wiki/Group_4_element. Published Jun. 11, 2010. Accessed Aug. 24, 2016, 6 pgs.

"Harmonic Drive AG", website, printed from http://harmoncdrive.aero/?idcat=471, Feb. 20, 2014, 2 pgs.
"Harmonic Drive Polymer GmbH", printed from http://www.harmonicdrive.de/English/the-company/subsidiaries/harmonic-drive-polymer-gmbh.html, Feb. 20, 2014, 1 pg.
"Introduction to Thermal Spray Processing", ASM International, Handbook of Thermal Spray Technology (#06994G), 2004, 11 pgs.
Abdeljawad et al., "Continuum Modeling of Bulk Metallic Glasses and Composites", Physical Review Letters, vol. 105, No. 12-17, Sep. 17, 2010, pp. 125503-1-125503-4.
Abrosimova et al., "Crystalline layer on the surface of Zr-based bulk metallic glasses", Journal of Non-Crystalline Solids, vol. 288, Mar. 6, 2001, pp. 121-126.
An et al., "Synthesis of single-component metallic glasses by thermal spray of nanodroplets on amorphous substrates", Applied Physics Letters, vol. 100, Jan. 26, 2012, pp. 041909-1-041909-4.
Anstis et al., "A Critical Evaluation of Indentation Techniques for Measuring Fracture Toughness: I, Direct Crack Measurements", Journal of the American Ceramic Society, vol. 64, No. 9, Sep. 1, 1981, pp. 533-538.
Ashby et al., "Metallic glasses of structural materials", Scripta Materialia, vol. 54, No. 3, Feb. 2006, pp. 321-326.
Bakkal, "Sliding tribological characteristics of Zr-based bulk metallic glass under lubricated conditions", Intermetallics, vol. 18, Mar. 19, 2010, pp. 1251-1253.
Bardt et al., "Micromolding three-dimensional amorphous metal structures", Journal of Materials Research, vol. 22, No. 2, Sep. 2006, pp. 339-343.
Basu et al., "Laser surface coating of Fe—Cr—Mo—Y—B—C bulk metallic glass composition on AISI 4140 steel", Surface & Coatings Technology, vol. 202, Mar. 15, 2008, pp. 2623-2631.
Berger, "A Survey of Additive Manufacturing Processes Applied on the Fabrication of Gears", Proceedings of the International Conference on Progress in Additive Manufacturing, May 26-28, 2014, pp. 315-320.
Boopathy et al., "Near-threshold fatigue crack growth in bulk metallic glass composites", Journal of Materials Research, vol. 24, No. 12, Dec. 2009 pp. 3611-3619.
Bordeenithikasem et al., "Glass forming ability, flexural strength, and wear properties of additively manufactured Zr-based bulk metallic glasses produced through laser powder bed fusion", Additive Manufacturing, vol. 21, Mar. 21, 2018, pp. 312-317.
Branagan et al., "Wear Resistant Amorphous and Nanocomposite Steel Coatings", Metallurgical and Materials Transactions A, vol. 32, 15 pgs., Oct. 2001, DOI: 10.1007/s11661-001-0051-8.
Byrne et al., "Bulk Metallic Glasses", Science, vol. 321, Jul. 25, 2008, pp. 502-503.
Cadney et al., "Cold gas dynamic spraying as a method for freeforming and joining materials", Surface & Coatings Technology, vol. 202, Mar. 15, 2008, pp. 2801-2806.
Calin et al., "Improved mechanical behavior of Cu—Ti-based bulk metallic glass by in situ formation of nanoscale precipitates", Scripta Materialia, vol. 48, No. 6, Mar. 17, 2003, pp. 653-658.
Chen et al., "Elastic Constants, Hardness and Their Implications to Flow Properties of Metallic Glasses", Journal of Non-Crystalline Solids, vol. 18, No. 2, Sep. 1975, pp. 157-171.
Chen et al., "Formation of Micro-Scale Precision Flexures Via Molding of Metallic Glass", Proceedings of the 21$^{st}$ Annual ASPE Meeting, Monterey, CA, 2006, 4 pgs.
Chen et al., "Influence of laser surface melting on glass formation and tribological behaviors of Zr55Al10Ni5Cu30 alloy", Journal of Materials Research, vol. 26, No. 20, Oct. 28, 2011, pp. 2642-2652.
Cheng et al., "Characterization of mechanical properties of FeCrBSiMnNbY metallic glass coatings", Journal of Materials Science, Jul. 1, 2009, vol. 44, pp. 3356-3363.
Cheng et al., "Correlation of the microstructure and mechanical properties of Zr-based in-situ bulk metallic glass matrix composites", Intermetallics, vol. 18, No. 12, Sep. 24, 2010, pp. 2425-2430.
Choi et al., "Tribological behavior of the kinetic sprayed Ni59Ti16Zr20Si2Sn3 bulk metallic glass", Journal of Alloys and Compounds, vol. 434-435, May 31, 2007, pp. 64-67.

(56) References Cited

OTHER PUBLICATIONS

Conner et al., "Shear band spacing under bending of Zr-based metallic glass plates", Acta Materialia, vol. 52, No. 8, May 3, 2004, pp. 2429-2434.
Conner et al., "Shear bands and cracking of metallic glass plates in bending", Journal of Applied Physics, vol. 94, No. 2, Jul. 15, 2003, pp. 904-911.
Singer et al., "Wear behavior of triode-sputtered MoS2 coatings in dry sliding contact with steel and ceramics", Wear, vol. 195, No. 1-2, Jul. 1996, pp. 7-20.
Sinmazcelik et al., "A review: Fibre metal laminates, background, bonding types and applied test methods", Materials and Design, vol. 32, No. 7, Aug. 2011, pp. 3671-3685.
Song et al., "Strategy for pinpointing the formation of B2 CuZr in metastable CuZr-based shape memory alloys", Acta Materialia, vol. 59, No. 17, Oct. 2011, pp. 6620-6630.
Sun et al., "Fiber metallic glass laminates", Journal of Materials Research, vol. 25, No. 12, Dec. 2010, pp. 2287-2291.
Sundaram et al., "Mesoscale Folding, Instability, and Disruption of Laminar Flow in Metal Surfaces", Physical Review Letters, vol. 109, Sep. 7, 2012, pp. 106001-1-106001-5.
Szuecs et al., "Mechanical Properties of Zr56.2Ti13.8Nb5.0Cu6.9Ni5.6Be12.5 Ductile Phase Reinforced Bulk Metallic Glass Composite", Acta Materialia, vol. 49, No. 9, May 25, 2001, pp. 1507-1513.
Tam et al., "Abrasion resistance of Cu based bulk metallic glasses", Journal of Non-Crystalline Solids, vol. 347, No. 1-3, Nov. 2004, pp. 268-272.
Tam et al., "Abrasive wear of Cu60Zr30Ti10 bulk metallic glass", Materials Science and Engineering A, vol. 384, No. 1-2, Oct. 2004, pp. 138-142.
Tan et al., "Synthesis of La-based in-situ bulk metallic glass matrix composite", Intermetallics, Nov. 2002, vol. 10, No. 11-12, Nov. 2002, pp. 1203-1205.
Tao et al., "Effect of rotational sliding velocity on surface friction and wear behavior in Zr-based bulk metallic glass", Journal of Alloys and Compounds, vol. 492, No. 1-2, Mar. 4, 2010, pp. L36-L39.
Tao et al., "Influence of isothermal annealing on the micro-hardness and friction property in CuZrAl bulk metallic glass", Advanced Materials Research, vol. 146-147, 2011, pp. 615-618.
Tobler et al., "Cryogenic Tensile, Fatigue, and Fracture Parameters for a Solution-Annealed 18 Percent Nickel Maraging Steel", Journal of Engineering Materials and Technology, Apr. 1978, vol. 100, pp. 189-194.
Wagner, "Mechanical Behavior of 18 Ni 200 Grade Maraging Steel at Cyrogenic Temperatures", J Aircraft, vol. 23, No. 10, Oct. 1986, pp. 744-749.
Wang et al., "Progress in studying the fatigue behavior of Zr-based bulk-metallic glasses and their composites", Intermetallics, vol. 17, No. 8, Aug. 2009, pp. 579-590.
Wikipedia, "Harmonic Drive", printed Feb. 20, 2014, 4 pgs.
Wu et al., "Bulk Metallic Glass Composites with Transformation-Mediated Work-Hardening and Ductility", Advanced Materials, vol. 22, No. 25, Jul. 7, 2010, pp. 2770-2773.
Wu et al., "Dry Sliding tribological behavior of Zr-based bulk metallic glass", Transactions of Nonferrous Metals Society of China, vol. 22, No. 3, Mar. 2012, pp. 585-589.
Wu et al., "Effects of environment on the sliding tribological behaviors of Zr-based bulk metallic glass", Intermetallics, vol. 25, Jun. 2012, pp. 115-125.
Wu et al., "Formation of Cu—Zr—Al bulk metallic glass composites with improved tensile properties", Acta Materialia, vol. 59, No. 8, May 2011, pp. 2928-2936.
Wu et al., "Use of rule of mixtures and metal volume fraction for mechanical property predictions of fibre-reinforced aluminum laminates", Journal of Materials Science, vol. 29, 1994, pp. 4583-4591.
Yao et al., "Fe-Based Bulk Metallic Glass with High Plasticity", Applied Physics Letters, vol. 90, 2007, pp. 061901-1-061901-3.
Yin et al., "Microstructure and mechanical properties of a spray-formed Ti-based metallic glass former alloy", Journal of Alloys and Compounds, vol. 512, No. 1, Jan. 25, 2012, pp. 241-245.
Yokoyama et al., "Tough Hypoeutectic Zr-Based Bulk Metallic Glasses", Metallurgical and Materials Transactions A, vol. 42A, Jun. 2011, pp. 1468-1475.
Zachrisson et al., "Effect of Processing on Charpy impact toughness of metallic glass matrix composites", Journal of Materials Research, vol. 26, No. 10, May 28, 2011, pp. 1260-1268.
Zhang et al., "Abrasive and corrosive behaviors of Cu—Zr—Al—Ag—Nb bulk metallic glasses", Journal of Physics: Conference Series, The 13th International Conference on Rapidly Quenched and Metastable Materials, vol. 144, Jan. 1, 2009, pp. 1-4.
Zhang et al., "Robust hydrophobic Fe-based amorphous coating by thermal spraying", Applied Physics Letters, vol. 101, No. 12, Sep. 20, 2012, pp. 121603-1-121603-4.
Zhang et al., "Wear behavior of a series of Zr-based bulk metallic glasses", Materials Science and Engineering A, vol. 475, No. 1-2, Feb. 25, 2008, pp. 124-127.
Zhou et al., "Microstructure and Electrochemical Behavior of Fe-Based Amorphous Metallic Coatings Fabricated by Atmospheric Plasma Spraying", Journal of Thermal Spray Technology, vol. 20, No. 1-2, Jan. 2011, pp. 344-350.
Zhu et al., "Ta-particulate reinforced Zr-based bulk metallic glass matrix composite with tensile plasticity", Scripta Materialia, vol. 62, No. 5, Mar. 2010, pp. 278-281.
Zhuo et al., "Ductile Bulk Aluminum-Based Alloy with Good Glass-Forming Ability and High Strength", Chinese Physics Letters, vol. 26, No. 6, 2009, pp. 066402-1-066402-4.
Zhuo et al., "Spray formed Al-based amorphous matrix nanocomposite plate", Journal of Alloys and Compounds, vol. 509, No. 18, May 5, 2011, pp. L169-L173.
Dai et al., "A new centimeter-diameter Cu-based bulk metallic glass", Scripta Materialia, vol. 54, No. 7, Apr. 2006, pp. 1403-1408.
Dai et al., "High-performance bulk Ti—Cu—Ni—Sn—Ta nanocomposites based on a dendrite-eutectic microstructure", Journal of Materials Research, vol. 19, No. 9, Sep. 2004, pp. 2557-2566.
Davis, "Hardness/Strength Ratio of Metallic Glasses", Scripta Metallurgica, vol. 9, No. 4, 1975, pp. 431-435.
De Beer et al., "Surface Folds Make Tears and Chips", Physics, vol. 5, No. 100, Sep. 4, 2012, 3 pgs.
Demetriou et al., "Glassy steel optimized for glass-forming ability and toughness", Applied Physics Letters, vol. 95, No. 4, Jul. 31, 2009, pp. 041907-1-041907-3; http:/idx.doi.org/10.1063/1.3184792.
Dislich et al., "Amorphous and Crystalline Dip Coatings Obtained from Organometallic Solutions: Procedures, Chemical Processes and Products", Metallurgical and Protective Coatings, vol. 77, 1981, pp. 129-139.
Duan et al., "Lightweight Ti-based bulk metallic glasses excluding late transition metals", Scripta Materialia, vol. 58, No. 6, Mar. 2008, pp. 465-468.
Duan et al., "Tribological properties of Zr41.25Ti13.75Ni10Cu12.5Be22.5 bulk metallic glasses under different conditions", Journal of Alloys and Compounds, vol. 528, Jul. 5, 2012, pp. 74-78.
Fan et al., "Metallic glass matrix composite with precipitated ductile reinforcement", Applied Physics Letters, vol. 81, No. 6, Aug. 5, 2002, pp. 1020-1022.
Fleury et al., "Tribological properties of bulk metallic glasses", Materials Science and Engineering A, vol. 375-377, Jul. 2004, pp. 276-279.
Fornell et al., "Enhanced mechanical properties and in vitro corrosion behavior of amorphous and devitrified Ti40Zr10Cu38Pd12 metallic glass", Journal of the Mechanical Behavior of Biomedical Materials, vol. 4, No. 8, Nov. 2011, pp. 1709-1717.
Fu et al., "Sliding behavior of metallic glass Part I. Experimental investigations", Wear, vol. 250, No. 1-12, Oct. 2001, pp. 409-419.
Ganesan et al., "Bonding behavior studies of cold sprayed copper coating on the PVC polymer substrate", Surface & Coatings Technology, vol. 207, Aug. 25, 2012, pp. 262-269.
Garrett et al., "Effect of microalloying on the toughness of metallic glasses", Applied Physics Letter, vol. 101, Dec. 12, 2012, 241913-1-241913-3.

(56) References Cited

OTHER PUBLICATIONS

Gleason Corporation, "Gear Product News", Introducing genesis, The Next Generation in Gear Technology, Apr. 2006, 52 pgs.
Gloriant, "Microhardness and abrasive wear resistance of metallic glasses and nanostructured composite materials", Journal of Non-Crystalline Solids, vol. 316, No. 1, Feb. 2003, pp. 96-103.
Greer, "Partially or fully devitrified alloys for mechanical properties", Materials and Science and Engineering A, vol. 304, May 31, 2001, pp. 68-72.
Greer et al., "Wear resistance of amorphous alloys and related materials", International Materials Reviews, vol. 47, No. 2, pp. 87-112.
Gu et al., "Selective Laser Melting Additive Manufacturing of Ti-Based Nanocomposites: The Role of Nanopowder", Metallurgical and Materials Transactions A, vol. 45, Jan. 2014, pp. 464-476.
Guo et al., "Tensile ductility and necking of metallic glass", Nature Materials, vol. 6, Oct. 2007, pp. 735-739.
Ha et al., "Tensile deformation behavior of two Ti-based amorphous matrix composites containing ductile β dendrites", Materials Science and Engineering A, vol. 552, Aug. 30, 2012, pp. 404-409.
Hale, "Principles and Techniques for Designing Precision Machines", Ph.D. Thesis, Feb. 1999, 493 pgs.
Harmon et al., "Anelastic to Plastic Transition in Metallic Glass-Forming Liquids", Physical Review Letters, vol. 99, Sep. 28, 2007, 135502-1-135502-4.
Haruyama et al., "Volume and enthalpy relaxation in Zr55Cu30Ni5Al10 bulk metallic glass", Acta Materialia, vol. 58, No. 5, Mar. 2010, pp. 1829-1836.
Hays et al., "Microstructure Controlled Shear Band Pattern Formation and Enhanced Plasticity of Bulk Metallic Glasses Containing in situ Formed Ductile Phase Dendrite Dispersions", Physical Review Letters, vol. 84, No. 13, Mar. 27, 2000, pp. 2901-2904.
He et al., "Novel Ti-base nanostructure-dendrite composite with enhanced plasticity", Nature Materials, vol. 2, Jan. 2003, Electronic Publication Dec. 8, 2002, pp. 33-37, doi: 10.1038/nmat792.
Hejwowski et al., "A comparative study of electrochemical properties of metallic glasses and weld overlay coatings", Vacuum, vol. 88, Feb. 2013, pp. 118-123.
Hofmann, "Bulk Metallic Glasses and Their Composites: A Brief History of Diverging Fields", Journal of Materials, vol. 2013, Jan. 10, 2013, 8 pgs.
Hofmann, "Shape Memory Bulk Metallic Glass Composites", Science, vol. 329, No. 5997, Sep. 10, 2010, pp. 1294-1295.
Hofmann et al., "Designing metallic glass matrix composites with high toughness and tensile ductility", Nature Letters, vol. 451, Feb. 28, 2008, pp. 1085-1090.
Hofmann et al., "Development of tough, low-density titanium-based bulk metallic glass matrix composites with tensile ductility", PNAS, vol. 105, No. 51, Dec. 23, 2008, pp. 20136-20140.
Hofmann et al., "Improving Ductility in Nanostructured Materials and Metallic Glasses: Three Laws", Materials Science Forum, vol. 633-634, 2010, pp. 657-663.
Hofmann et al., "Semi-solid Induction Forging of Metallic Glass Matrix Composites", JOM, vol. 61, No. 12, Dec. 2009, pp. 11-17, plus cover.
Hong et al., "Microstructural characteristics of high-velocity oxygen-fuel (HVOF) sprayed nickel-based alloy coating", Journal of Alloys and Compounds, vol. 581, Dec. 25, 2013, pp. 398-403.
Hu et al., "Crystallization Kinetics of the Cu47.5Zr47.5Al5 Bulk Metallic Glass under Continuous and Iso-thermal heating", Applied Mechanics and Materials, vol. 99-100, Sep. 8, 2011, pp. 1052-1058.
Huang et al., "Dendritic microstructure in the metallic glass matrix composite Zr56Ti14Nb5Cu7Ni6Be12", Scripta Materialia, vol. 53, No. 1, Jul. 2005, pp. 93-97.
Huang et al., "Fretting wear behavior of bulk amorphous steel", Intermetallics, vol. 19, No. 10, Oct. 2011, pp. 1385-1389.
Inoue et al., "Cobalt-based bulk glassy alloy with ultrahigh strength and soft magnetic properties", Nature Letters, vol. 2, Oct. 2003, pp. 661-663.
Inoue et al., "Development and applications of late transition metal bulk metallic glasses", Bulk Metallic Glasses, 2008, pp. 1-25.
Inoue et al., "Developments and applications of bulk metallic glasses", Reviews on Advanced Materials Science, vol. 18, Feb. 28, 2008, pp. 1-9.
Inoue et al., "Preparation of 16 mm Diameter Rod of Amorphous Zr65Al7.5Ni10Cu17.5 Alloy", Material Transactions, JIM, vol. 34, No. 12, 1993, pp. 1234-1237.
Inoue et al., "Recent development and application products of bulk glassy alloys", Acta Materialia, vol. 59, No. 6, Apr. 2011, pp. 2243-2267.
Ishida et al., "Wear resistivity of super-precision microgear made of Ni-based metallic glass", Materials Science and Engineering A, vol. 449-451, Mar. 25, 2007, pp. 149-154.
Jiang et al., "Low-Density High-Strength Bulk Metallic Glasses and Their Composites: A Review", Advanced Engineering Materials, vol. 17, No. 6, Nov. 19, 2014, pp. 1-20, DOI: 10.1002/adem.201400252.
Jiang et al., "Tribological Studies of a Zr-Based Glass-Forming Alloy with Different States", Advanced Engineering Materials, vol. 11, No. 11, Nov. 18, 2009, pp. 925-931.
Johnson et al., "Quantifying the Origin of Metallic Glass Formation", Nature Communications, Jan. 20, 2016, vol. 7, No. 10313, 7 pgs. doi: 10.1038/ncomms10313.
Jung et al., "Fabrication of Fe-based bulk metallic glass by selective laser melting: A parameter study", Materials and Design, vol. 86, Jul. 30, 2015, pp. 703-708.
Kahraman et al., "A Feasibility Study on Development of Dust Abrasion Resistant Gear Concepts for Lunar Vehicle Gearboxes", NASA Grant NNX07AN42G Final Report, Mar. 11, 2009, 77 pgs.
Kim et al., "Amorphous phase formation of Zr-based alloy coating by HVOF spraying process", Journal of Materials Science, vol. 36, 2001, pp. 49-54.
Kim et al., "Design and synthesis of Cu-based metallic glass alloys with high glass forming ability", Journal of Metastable and Nanocrystalline Materials, vol. 24-25, Sep. 1, 2005, pp. 93-96.
Kim et al., "Enhancement of metallic glass properties of Cu-based BMG coating by shroud plasma spraying", Surface & Coatings Technology, Jan. 25, 2011, vol. 205, pp. 3020-3026.
Kim et al., "Oxidation and crystallization mechanisms in plasma-sprayed Cu-based bulk metallic glass coatings", Acta Materialia., vol. 58, Feb. 1, 2010, pp. 952-962.
Kim et al., "Production of Ni65Cr15P16B4 Metallic Glass-Coated Bipolar Plate for Fuel Cell by High Velocity Oxy-Fuel (HVOF) Spray Coating Method", The Japan Institute of Metals, Materials Transactions, vol. 51, No. 9, Aug. 25, 2010, pp. 1609-1613.
Kim et al., "Realization of high tensile ductility in a bulk metallic glass composite by the utilization of deformation-induced martensitic transformation", Scripta Materialia, vol. 65, May 3, 2011, pp. 304-307.
Kim et al., "Weldability of Cu54Zr22Ti18Ni6 bulk metallic glass by ultrasonic welding processing", Materials Letters, vol. 130, Sep. 1, 2014, pp. 160-163.

* cited by examiner

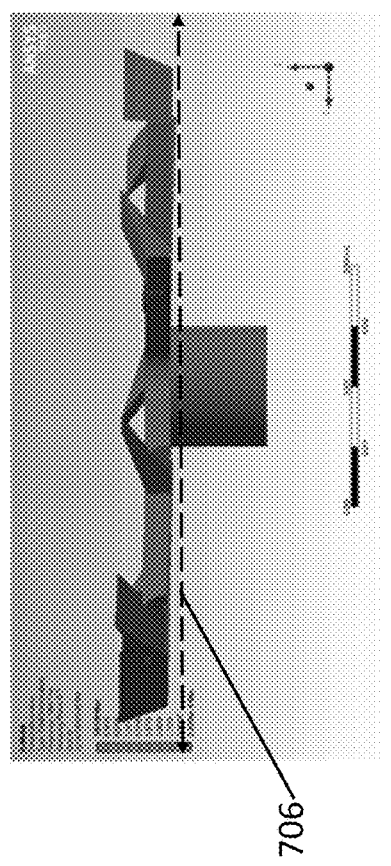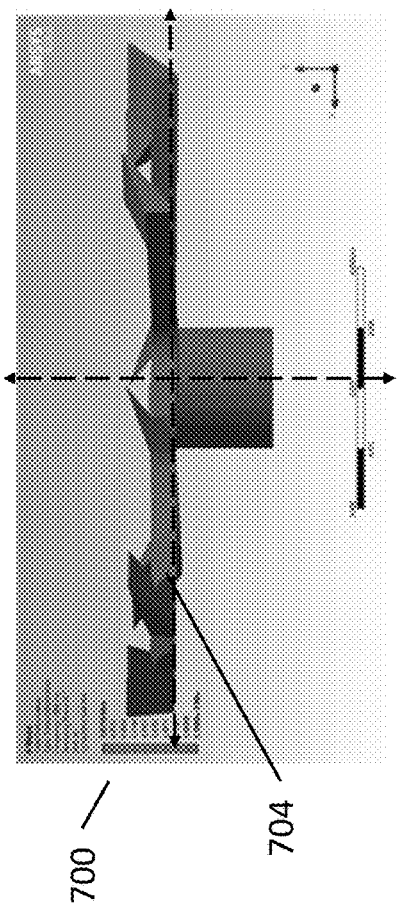
Fig. 7E
Fig. 7F
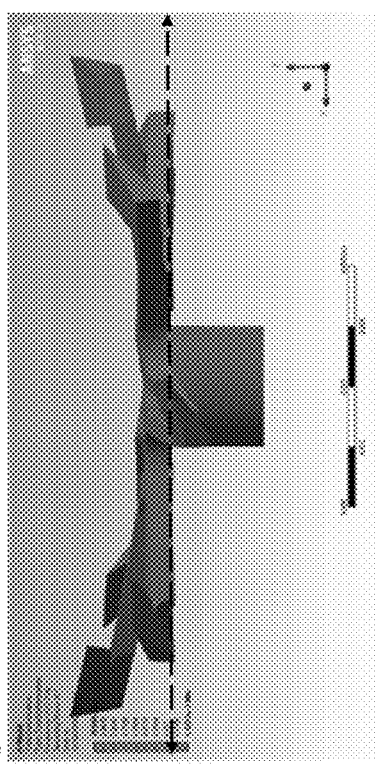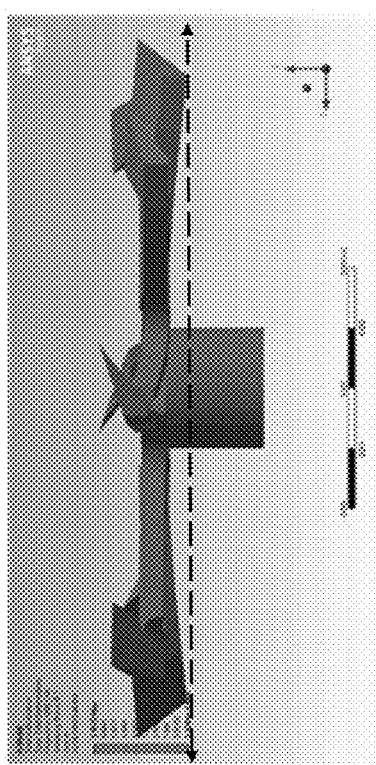
Fig. 7G
Fig. 7H

SELF-HAMMERING CUTTING TOOL

CROSS-REFERENCED APPLICATIONS

This application claims priority to U.S. Provisional Patent Application No. 62/812,555 filed on Mar. 1, 2019. The disclosure of which is included herein by reference in its entirety.

STATEMENT OF FEDERALLY SPONSORED RESEARCH

This invention was made with government support under Grant No. 80NM0018D004 awarded by NASA (JPL). The government has certain rights in the invention.

FIELD OF THE INVENTION

The present invention generally relates to cutting tools, and more specifically to cutting tools that are adaptable to implement a self-hammering action based on the rotational frequency of the tool.

BACKGROUND OF THE INVENTION

A cutting tool is typically described by a shaft that is connected to a rotating element, such as a drill or saw, a body that connects the shaft to the cutting teeth, and the cutting teeth. In conventional designs, the body that connects the cutting teeth to the shaft is made as rigid as possible to allow the cutting teeth to have maximum engagement with the material being cut without slipping or bending.

Cutting tools have been used in a variety of industries to cut or bore a variety of materials including rock, wood, metal, composite, plastic, etc. Traditional cutting tools, including saws, drills, hammer drills, etc., are designed to remove material when the hardened edges of the tool are forced against the surface of the material to be cut. Typically, the hardness of the tool is greater than that of the material which allows the tool to adequately cut and in some cases remove portions of the material. Cutting tools can either be sharp on the cutting surface or dull. Dull cutting surfaces can be used to cut harder material such as rock. In some instances inserts can be used on the cutting surface that are replaceable such that as the cutting surface or element is no longer effective it can be replaced with a new cutting surface to continue cutting.

Some operations for cutting, drilling, and/or boring, can require the use of a technique called hammering. Hammering can be added to a tool to force the tool to engage in more than one mode of material removal. Hammering is often used to prevent tools from becoming stuck in hard or non-compliant materials. In addition to preventing tools from becoming stuck, hammering can encourage the material to be more compliant and break into smaller pieces that are more easily manageable.

Many of the cutting tools used today are subject to traditional manufacturing processes that include machining components, adding additional elements to the tool by welding, bolting, or another fastening method, and also adding coatings to the tool to help improve the overall strength and cutting effectiveness. Traditional manufacturing methods tend to limit the tools to more simple and less complex designs relying on the concept that cutting tools need to be harder than the material they are cutting. Accordingly, opportunities to capitalize on improve technologies can be missed.

BRIEF SUMMARY OF THE INVENTION

Many embodiments are directed to a cutting tool with flexible members that are designed to provide a hammering like effect against the material being cut. In many embodiments the tool has a centralized shaft with a central axis where the shaft is configured to connect to a rotational element such that the cutting tool is rotatable about the central axis at a rotational frequency. Additionally the tool has a resiliently compliant support element connected to the centralized shaft where the resiliently compliant support element moves in correlation to the rotational frequency at a preferred resonance frequency. Each tool also has a cutting element connected to at least a portion of the resiliently compliant support element wherein the cutting element produces a hammering effect as a result of movement from the resiliently compliant support element.

In other embodiments the tool has a plurality of resiliently compliant support elements wherein each of the plurality of resiliently compliant support elements extend radially outward from the central axis such that they are elongated elements having a first portion connected to the centralized shaft and a second portion, and wherein each of the plurality of resiliently compliant support elements rest in a resting plane when not rotating and where each of the plurality of resiliently compliant support elements flex out of plane when rotating; and a plurality of cutting elements wherein each of the plurality of cutting elements corresponds to at least one of the plurality of resiliently compliant support elements and is connected to the second portion thereof.

In still other embodiments, each of the plurality of resiliently compliant support elements comprises a secondary flex element interconnected between at least two of the cutting elements.

In yet other embodiments, the secondary flex element is selected from a group of shapes consisting of, "V" shaped, "U" shaped, and straight.

In still yet other embodiments, the cutting tool is manufactured from a material selected from a group consisting of steel, titanium, composite, nickel-based alloy, metal matrix composite, carbide-reinforced alloy, bulk metallic glass, amorphous metal, tungsten, niobium, vanadium, and molybdenum.

In other embodiments, the elongated shaft has a bore hole that extends through the shaft running along the central axis from the first end to the second end.

In still other embodiments, the cutting tool is selected from a group consisting of saw blade, coring blade, rock drilling bit, and a chainsaw.

In yet other embodiments, the resiliently compliant support element has a vibrational mode based on the geometry of the tool.

In other embodiments, the vibrational mode is a traveling wave pattern.

In still other embodiments, the vibrational mode is an arched cross sectional pattern.

In yet other embodiments, the vibrational mode is a traveling wave pattern.

In still yet other embodiments, the vibrational mode is a V-shaped cross sectional pattern.

In other embodiments, the vibrational mode is a horizontal cross sectional pattern.

In still other embodiments, the vibrational mode is angled wave cross sectional pattern.

In yet other embodiments, the cutting tool is a self-hammering cutting tool.

In still yet other embodiments, the cutting element is made from a metal matrix composite.

In other embodiments, the cutting tool has a strain gage disposed on resiliently compliant support element and electronically connected to an output device wherein an applied force on the resiliently compliant support element will generate a strain or stress signal, and wherein the strain or stress signal is transmitted from the strain gage to the output device.

In still other embodiments, the tool is adapted to cut through a material selected from a group consisting of rock, dirt, oil, oil sands, wood, ice, metal, ice and rock, cement, and composite.

In yet other embodiments, the tool is adapted for use in an industry selected from a group consisting of mining, oil extraction, gas extraction, ore mining, rock cutting, construction, ice cutting, and machining.

In still yet other embodiments, the cutting tool is produced using additive manufacturing.

In other embodiments, the cutting tool is heat treated after manufacturing to strengthen the tool.

In still other embodiments, the cutting tool has a coating on a cutting surface of the cutting element wherein the coating provides an additional hardening element to the surface of the cutting element.

In yet other embodiments, the cutting tool has an additional mass connected to a portion of the cutting element, wherein the additional mass operates to alter the preferred resonance frequency of the tool.

In still yet other embodiments, the additional mass is a carbide bit.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention, wherein:

FIGS. 7A through 7I illustrate various vibrational modes of a cutting tool in accordance with embodiments of the invention.

DETAILED DESCRIPTION OF THE INVENTION

Figure 1:
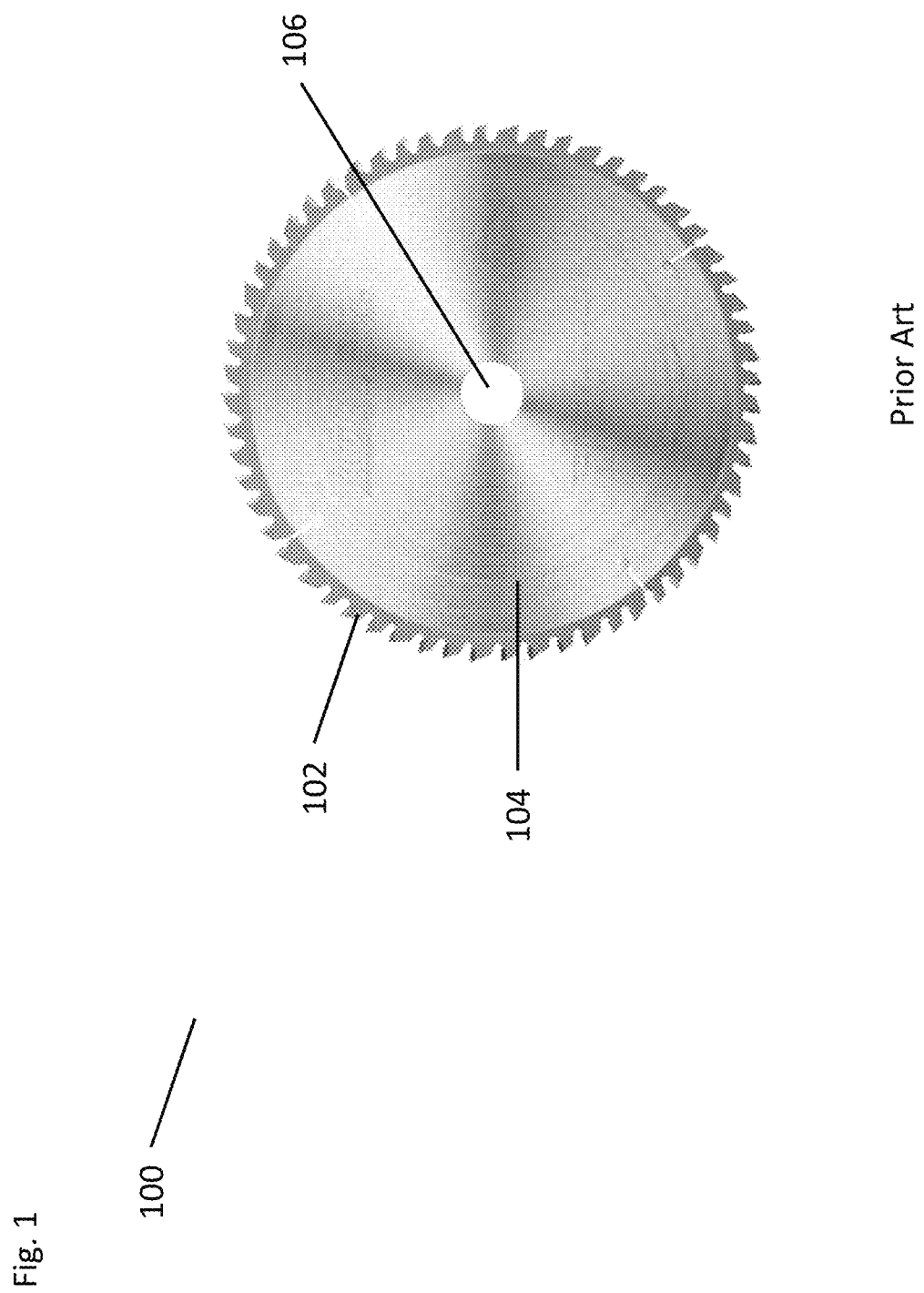
FIG. 1 illustrates a traditional saw blade in accordance with known art.

Turning now to the drawings, many embodiments are directed to a cutting tool with multiple support arms that extend outward from a central shaft and rest at one end of the shaft in plane parallel to the end of the shaft. In various embodiments, each of the support arms is configured with at least one cutting element that is positioned to cut a desired surface. The cutting tool, according to some embodiments, is designed to rotate about a central axis when it is installed in another mechanical device such as a motor. Additionally, in many embodiments, each of the support arms are designed to flex out of plane from the resting plane in accordance with a rotational frequency of the tool as it spins. The effect of the tool, in some embodiments allows for a cutting and/or self-hammering effect to cut through a variety of materials.

As discussed previously, many traditional cutting tools are designed to be much harder than the material that is to be cut, thus avoiding excessive bending and flexing of the tool during operation. Accordingly, cutting tools tend to be hard and inflexible which can make them difficult to adapt for different applications such as cutting, coring, boring, etc. This often results in bulky heavy cutting tools because additional elements are often added to provide additional strength and stiffness. Furthermore, when a hammering effect is needed for non-compliant or harder materials, additional mechanical features used in conjunction with the cutting tool are typically required to provide the hammering affect. These additional mechanical features add bulk and weight to the overall tool. Moreover, traditional tools are also often constrained to conventional manufacturing methods such as machining and grinding to produce the cutting tool. Traditional manufacturing methods tend to limit the tools to less complex designs and geometries thereby adding unnecessary limitations to the types of additional elements that can be incorporated with the tools. As a result of these limitations, conventional cutting operations often require large numbers of cost effective tools, resulting in the use of cheaper tools that tend to wear faster.

Embodiments provide cutting tools with enhanced cutting abilities and characteristics, as well as methods for manufacturing more complex designs using additive manufacturing. For example, many embodiments encapsulate a cutting tool with more compliant components rather than traditional stiffer elements. Such embodiments go against conventional wisdom in tool manufacturing and therefore can result in more unconventional designs. In many embodiments, more compliant support elements with cutting elements, such as cutting teeth, can have vibrational modes that are activated during normal cutting operations at various rotational frequencies of the tool. For example, many embodiments may implement hammering effects that can operate to prevent the blade from stalling during operation. In various embodiments, these effects are achieved as the support members bend, flex and/or twist in accordance with the associated operational rotational frequency. Accordingly, in many embodiments, the cutting elements on the blade can have multiple cutting modes not otherwise possible on conventional tools. Furthermore, the use of additive manufacturing can allow for more complex designs to be used for the tool, and can allow for different materials to be incorporated within the same component. Additionally, many embodiments can be rapidly modified to optimize the design and functionality of the tool.

Figure 2:
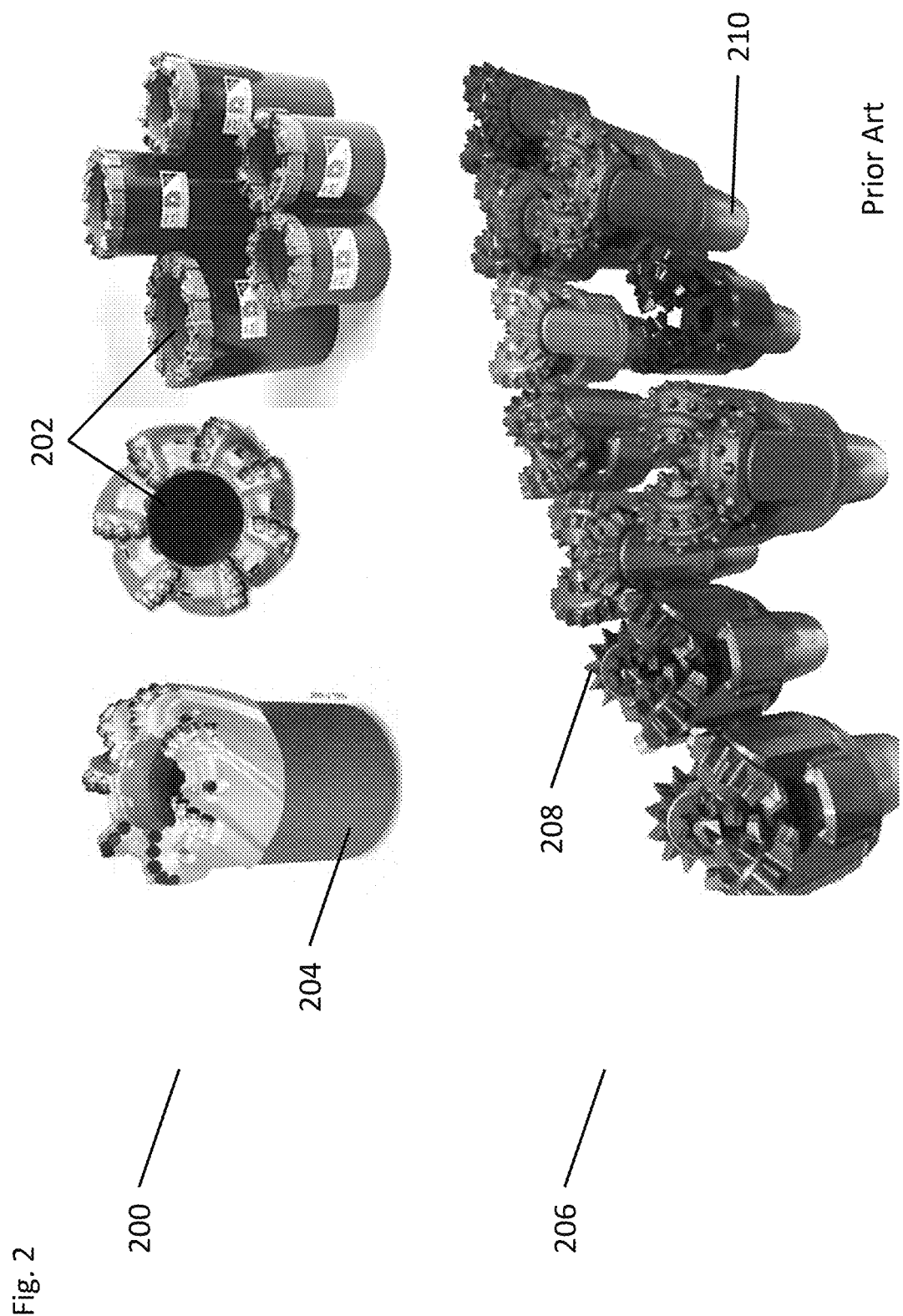
FIG. 2 illustrates various coring bits used in mining in accordance with known art.
Figure 3:
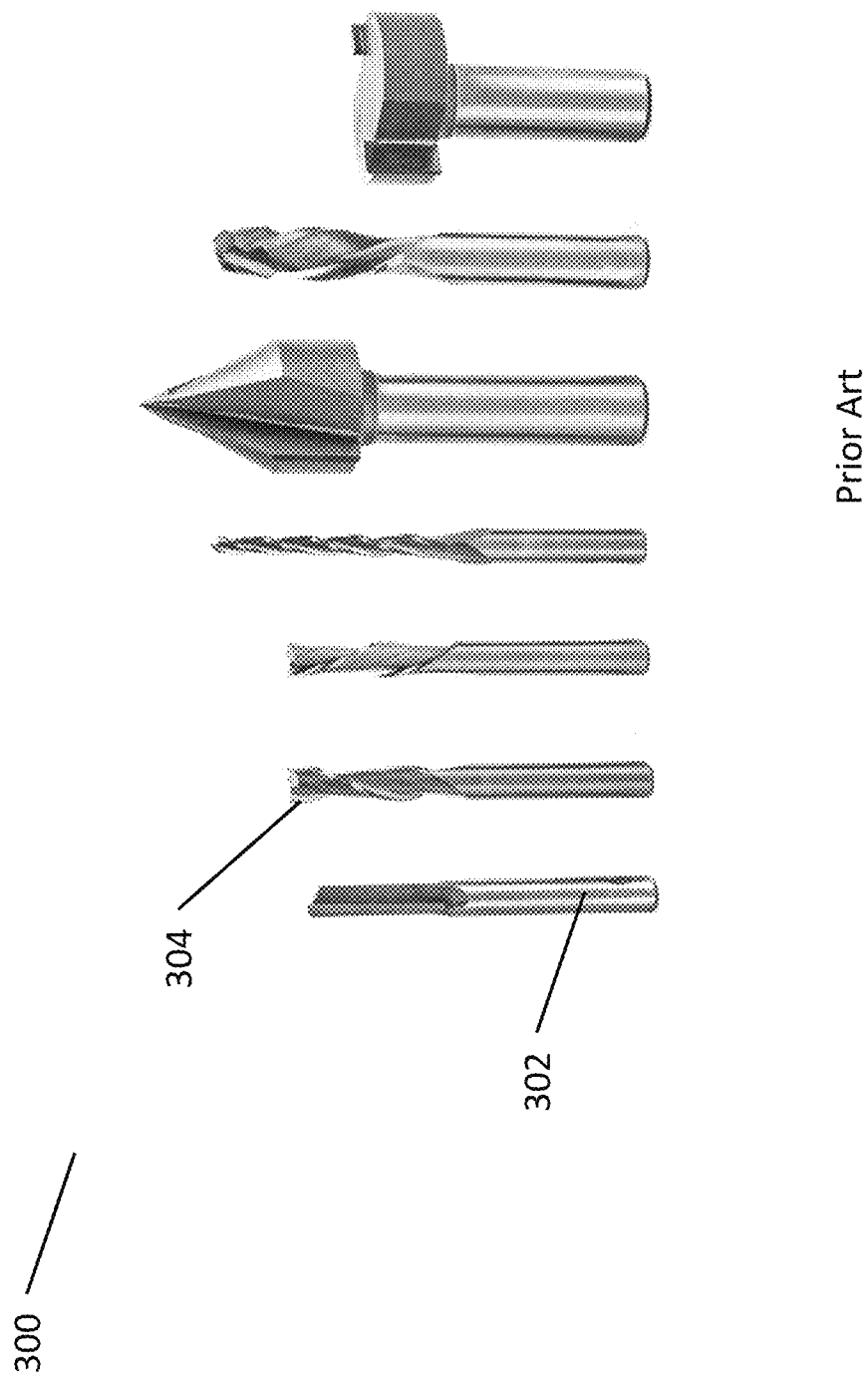
FIG. 3 illustrates a variety of drill and cutting bits in accordance with known art.

Turning now to the figures, traditional cutting elements can be seen in FIGS. 1 through 3. FIG. 1 illustrates a traditional saw blade 100 according to known art. The saw blade 100 may have multiple cutting teeth 102 positioned on the outside edge of the body of the blade 104. Additionally, as with many traditional cutting tools, the saw blade may have a central bore 106 to allow it to be attached to a rotational device such as a motor.

Other traditional cutting tools may consist of a cutting element attached to a centralized shaft. For example, FIGS. 2 and 3 illustrate different cutting tools where the cutting element is positioned on one end of a centralized elongated shaft. FIG. 2 for example, illustrates a variety of coring tools. The upper set of tools 200 illustrate coring bits for mining with cutting elements 202 positioned at one end of the cutting tool. The other end of the tool 200 is an elongated hollow shaft 204 for attachment to other elements of the coring equipment. The bottom set of tools 206 are other types of mining bits used for breaking rock. The cutting element 208 are each independently rotating elements are activated by the rotation of the shaft 210. FIG. 3 illustrates various conventional cutting tools 300 that are used for machining purposes. Such tools are often designed to be extremely rigid and stiff where the shaft 302 connects to a motor and the cutting surface 304.

Figure 4:
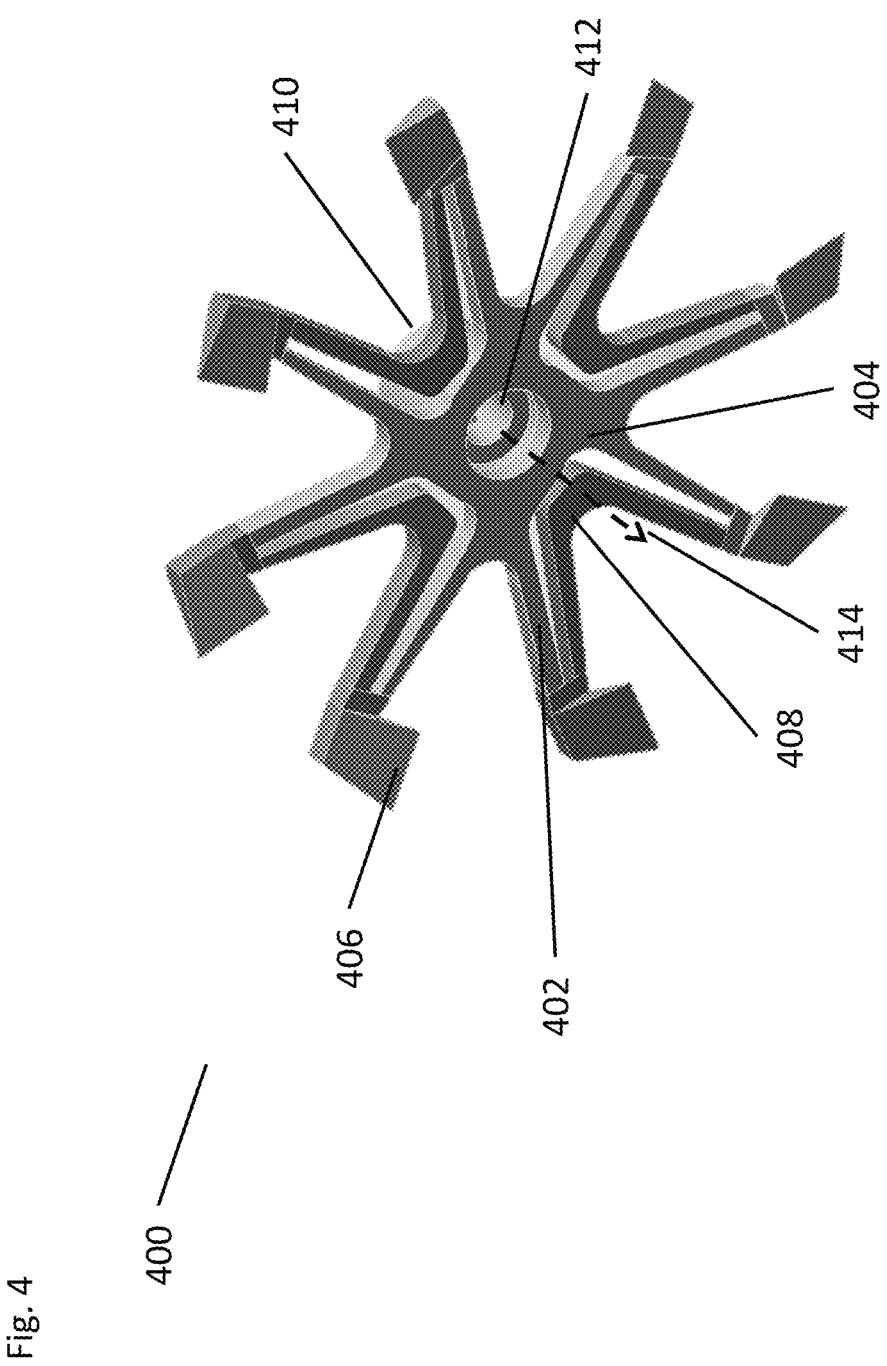
FIG. 4 illustrates a cutting tool in accordance with embodiments of the invention.

Turning now to FIG. 4, an embodiment of a compliant cutting tool 400 having flexible cutting elements is illustrated. In many embodiments, the cutting tool 400 is made up of a number of support members 402 that extend outwardly from a central base component 404 and are connected to cutting elements 406. The support arms are designed to provide structural support for the cutting elements 406. Additionally, many embodiments may incorporate resilient members 408. The resilient members 408 may be positioned between support arms in some embodiments. In accordance with many embodiments, the resilient members 408 can provide additional structural support as well as allow for the flexing of the support arms or the movement of the cutting elements 406 in and out of a resting plane during operation. In accordance with many embodiments the cutting elements 406 may flex in accordance with the geometric shape and design of the support elements 402 as well as the resilient members 408. Accordingly, in some embodiments, the base component 404 may be any number of geometric shapes including, square, triangles, circles, etc. In some embodiments, the support arms 402 and the base component 404 may form a single body that is connected to the cutting elements 406 such that the support elements 406 also serve as the resilient members 408. As can be appreciated, the flexure or movement of the resilient members, resulting in the movement of the cutting elements 406 might produce a hammering type affect as the cutting element 406 interact with different surfaces. For example, as the cutting element 406 contacts a portion of the material to be cut, the flexibility of the resilient member 408 can allow for the retracted movement of the cutting element 406 from the material. In cooperation with such movement, the geometric design and resonant frequency that corresponds to the tool design will allow for the cutting element to vibrate back towards the material, thus creating a cyclic pattern of hammering or chiseling against a material surface. Accordingly the material would gradually be cut and/or removed without the cutting element being caught or stuck in the material.

In accordance with many embodiments the cutting tool 400 may be adapted to being held in another tool or rotation device. Accordingly, in many embodiments, the base component 404 can be connected to a central shaft 410 so that the tool 400 can be connected to a motor similar. In some embodiments the shaft may resemble a solid elongated shaft that extend off of one end of the tool similar to the tools illustrated in FIGS. 2 and 3. In other embodiments, the base component 404 may have a central bore 412 without a shaft to allow for the tool 400 to be connected to a motor much like the blade shown in FIG. 1. In some embodiments, the bore may be designed to accept a separate shaft (not shown) or may be have a countersunk design to fit within another tool. Accordingly, in many embodiments, the design of the cutting tool can vary based on the desired operation and/or material to be cut. Moreover, in many embodiments, the cutting element 408 may be take on any number of shapes such as wedges, angled teeth, diamonds, etc., based on the desired mode of operation.

Regardless of the specific design of the base and/or shaft, and/or the specific cutting elements, in accordance with many embodiments, the support arms 402 and/or the body may be flexible or compliant with respect to the base component 404 or central shaft 410. In other words the support elements (402 & 404) for the cutting elements 406 may be designed to flex or bend during operation. Specifically, in many such embodiments, as the tool 400 rotates about a central axis 414, the support elements (402 & 404) may bend out of plane with the resting state of the elements. In some embodiments, the amount of flex or bend is dependent on the rotational frequency of the tool 400 and the speed of the motor. For example, as the motor speed increases or decreases within the normal parameters of the tool and/or motor, the tool 400 may reach certain frequencies associated with the design and composition of the tool 400 which result in the bending of the support elements (402 and 404) to a degree. Thus, many embodiments may illustrate various vibrational modes that can be activated during normal operation of the cutting tool. Some embodiments may activate a vibrational mode the produces a hammering-like effect in each of the cutting elements.

Figure 5:
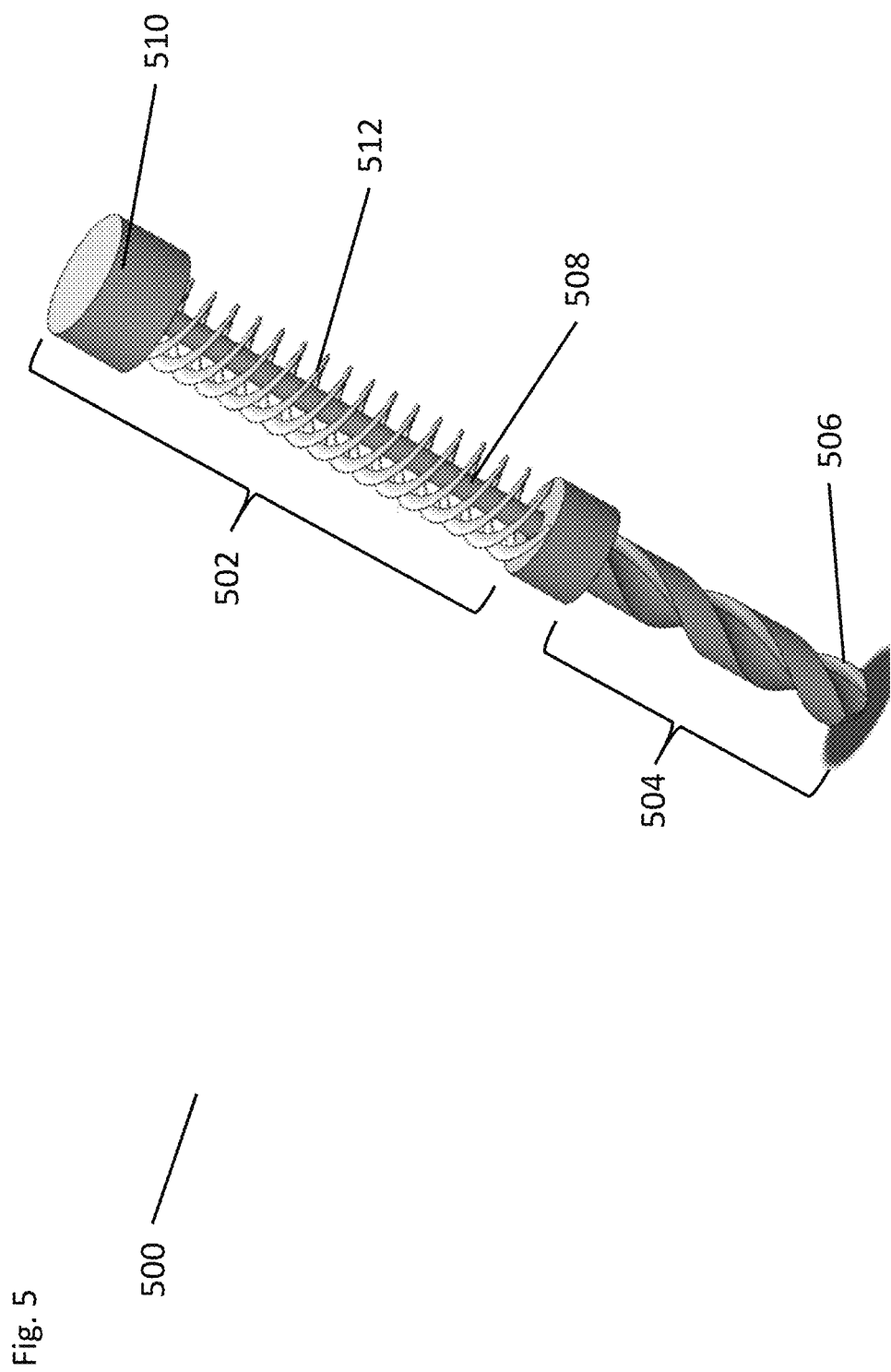
FIG. 5 illustrates a variation of a cutting tool in accordance with embodiments of the invention.

Turning now to FIG. 5 another embodiment of a cutting tool can be shown. In accordance with many embodiments, a cutting tool 500 can be adapted for cutting in a different method from embodiments similar to FIG. 4. For example, rather than producing a chiseling effect, the cutting tool 500 can be adapted for drilling while producing a similar hammering effect on the material. In accordance with many embodiments, the cutting tool 500 may have a resilient section 502 and a cutting section 504. In many embodiments, the cutting section 504 may resemble a standard drill bit with an elongated shaft configured with a spiraling cutting edge 506. In some embodiments the cutting section 504 may also resemble a traditional coring or rock cutting bit as illustrated in FIG. 2. In accordance with many embodiments, the cutting section may be designed to be stiff or hard enough to cut through the desired material. Additionally, many embodiments may be designed to move along a central shaft 508 towards a base 510 of the tool. In many embodiments, the movement of the cutting section 504 may be controlled by a spring element 512 positioned between the base 510 and the cutting portion 504. Similar to the embodiments illustrated in FIG. 4, the rotational movement of the drill type cutting tool 500 may drive the movement of the cutting surface towards and away from the material being cut based on the response from the spring element 512. The spring element, in accordance with many embodiments, can be designed to apply pressure as well as provide a resilient force to retract the cutting surface 506 from the material and likewise produce a hammering effect. The hammering effect can help to reduce tool wear as well as prevent the tool from being stuck in the material. In accordance with many embodiments, the spring may have any variety of cross sections to produce the required resilient forces for the different operations such as drilling, coring, boring, and/or rock cutting. Additionally, some embodiments may incorporate one or more springs 512 to produce the desired resilient force for the operation.

Figure 6A:
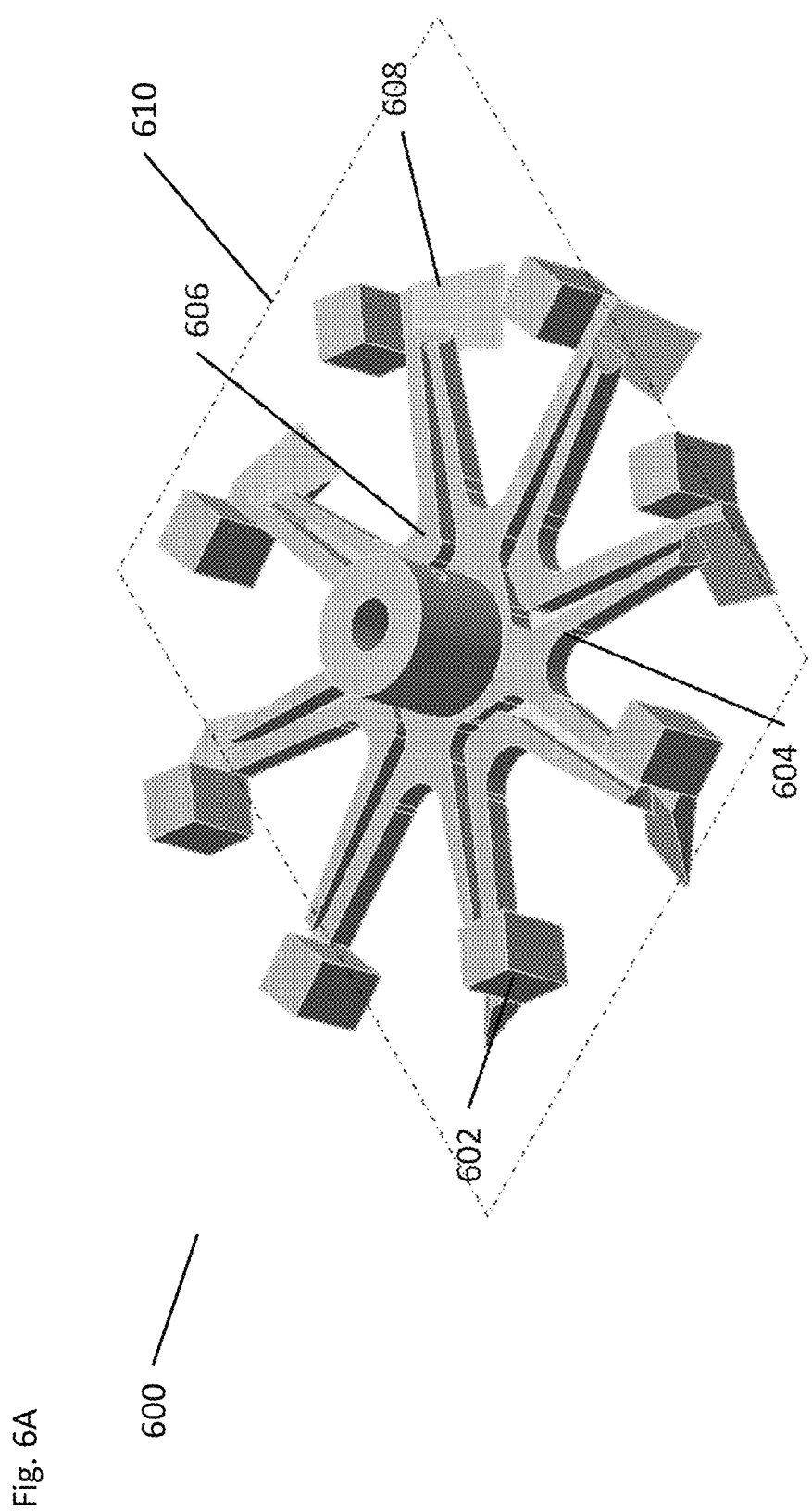
FIGS. 6A and 6B illustrate a cutting tool with additional mass in accordance with embodiments of the invention.
Figure 6B:
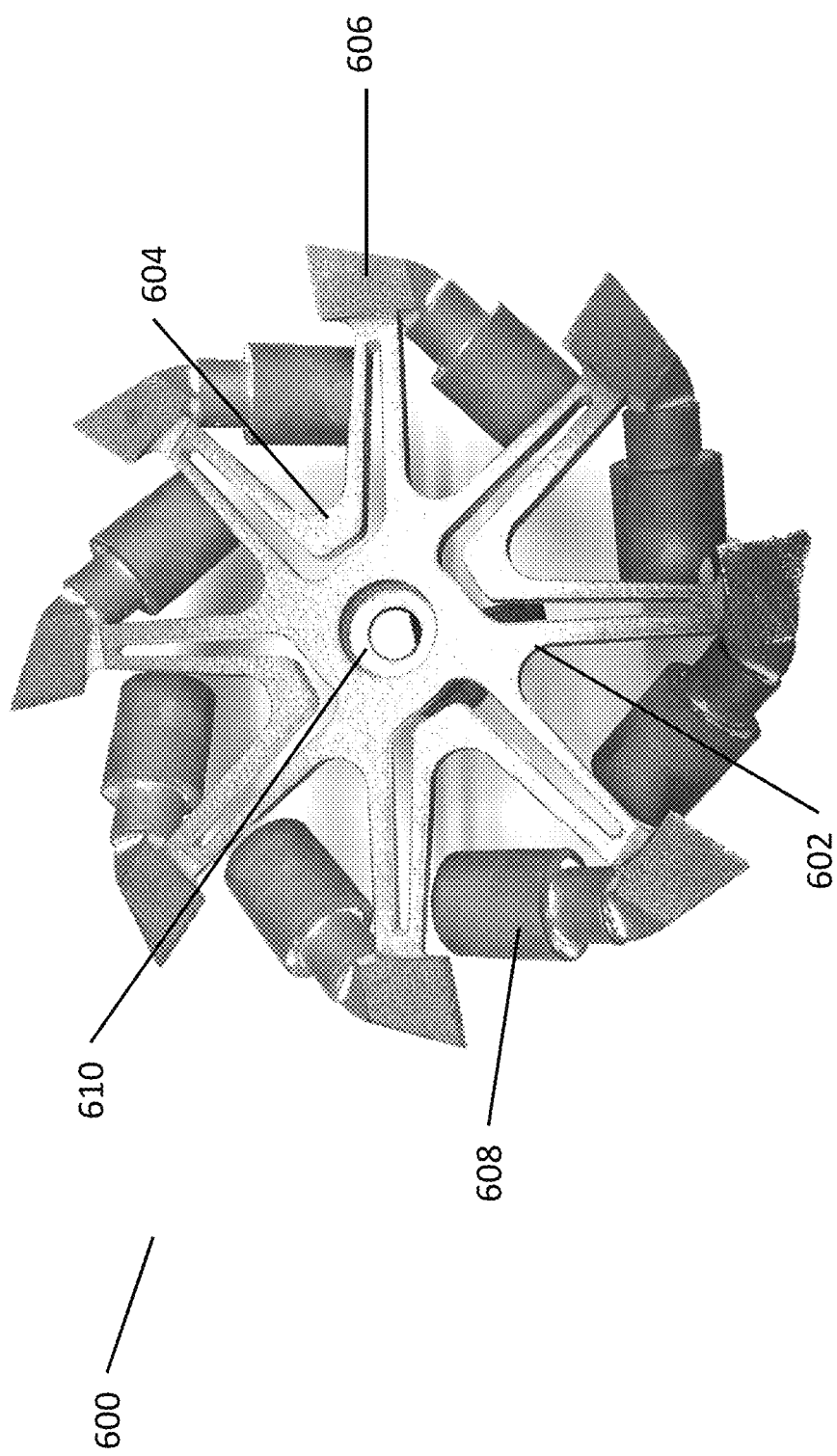

As can be appreciated, the desired resilient force can vary depending on the material that is being cut and the cutting mode of the tool. Accordingly, many embodiments may operate at different resonant frequencies based on the tool design. For example, FIGS. 6A and 6B illustrate embodiments of a cutting tool 600 with additional mass 602 placed at the end of each of the support arm structures (604 and 606). The additional mass 602 may be incorporated into the cutting element 608 or may be in addition to. Accordingly, the additional mass 602 can provide for additional flex in the resilient members 606 as the cutting tool rotates at the various rotational frequencies. In other words, the additional mass can change the resonance frequency of the cutting tool resulting in more movement out of the resting plane 610. FIG. 6B illustrates a cutting tool with additional mass 602 at the end of the support arm structures (604 and 606) that has a cylindrical shape. It can be appreciated that many embodiments may have a variety of shapes for additional mass. For example, in some embodiments the additional mass may be in the form of an additional cutting element such as a carbide bit.

Figure 7A:
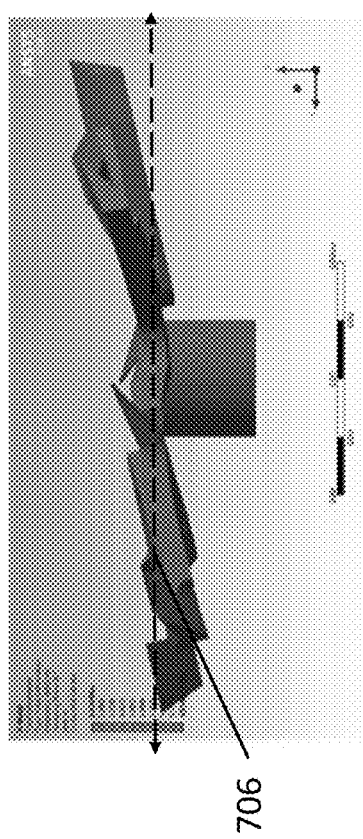
Figure 7B:
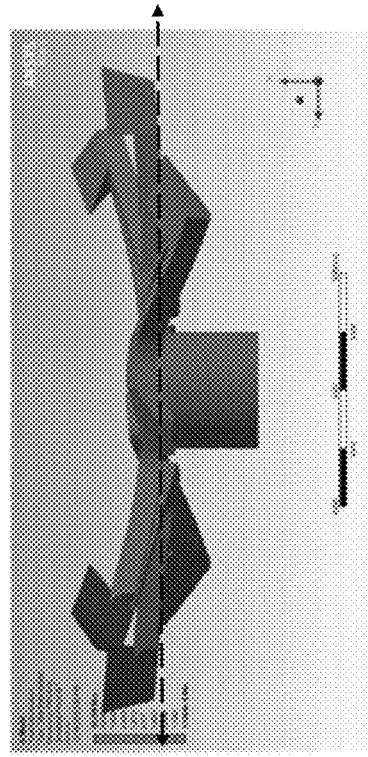
Figure 7C:
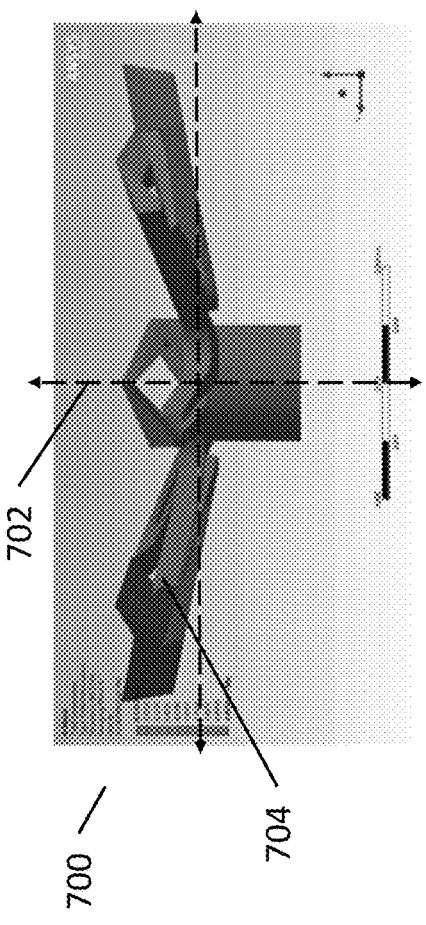
Figure 7D:
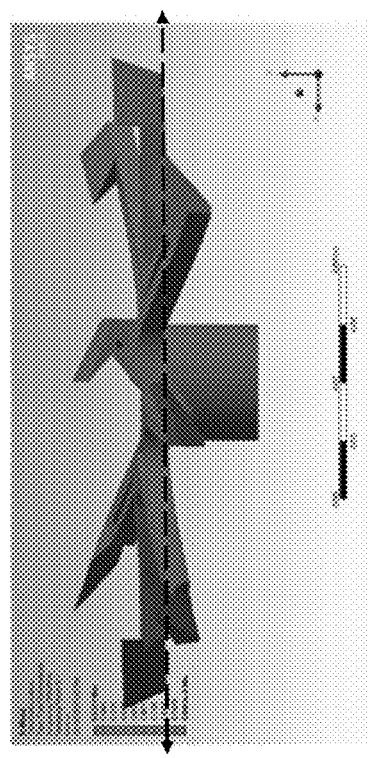
Figure 71:
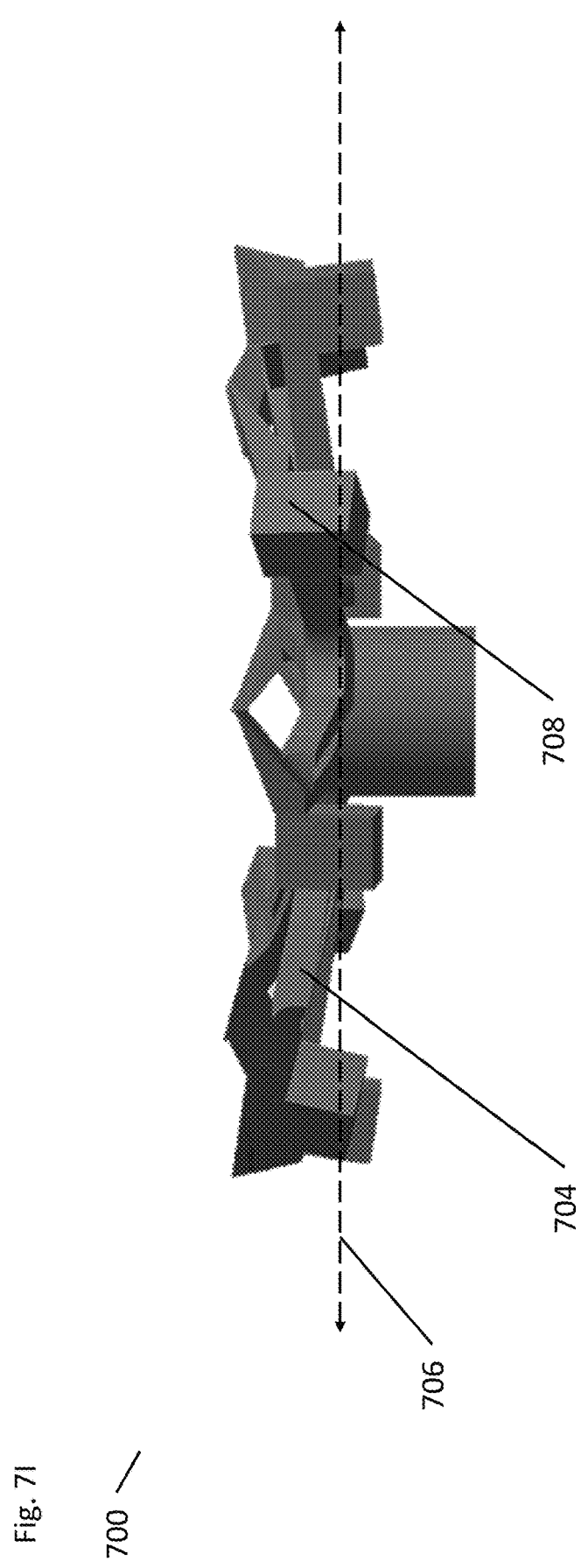

Turning now to FIGS. 7A through 7I, various embodiments of cutting tool vibrational modes are illustrated. In accordance with many embodiments, the cutting tool 700 can be designed with a number of different geometric shapes and designs. Each design will naturally have an associated number and type of vibrational modes in which the design prefers to exhibit or move in based on the rotational frequency of the tool. For example as a tool 700 rotates about a central axis 702 in any given motor or tool (not shown). FIGS. 7A through 7I illustrate screen shots of videos illustrating various embodiments of preferred vibrational modes of a cutting tool based on the geometric design. For example. FIG. 7A illustrates a "v" shaped vibrational mode while FIG. 7B illustrates an "s" shaped vibrational mode, according to embodiments of the invention. It can be appreciated that embodiments with the "v" shaped mode can move the support elements 704 all out of plane from the resting plane 706 at the same time. In other embodiments, the support element 704 may move in such a manner that half of the elements are above the resting plane 706 while the other half are below the plane as seen in FIG. 7B. FIG. 7D illustrates an embodiment where the support elements 704 are representative of a traveling wave where the support elements 704 move up and down in a wave like pattern.

FIGS. 7E through 7H further illustrate alternate vibrational modes of embodiments of a cutting tool. For example. FIG. 7E illustrates an embodiment of a vibrational mode where the support elements maintain a frequency within the resting plane. FIG. 7F illustrates a vibrational mode where the support elements bend at an upward slat to the resting plane 706. Additionally, FIG. 7G illustrates an embodiment of a cutting tool 700 whose design and resonance frequency generate a vibrational mode in an arched like pattern. FIG. 7I illustrates an embodiment of a vibrational mode in accordance with modified geometries having additional mass 708 at the end of the support elements.

Figure 8C:
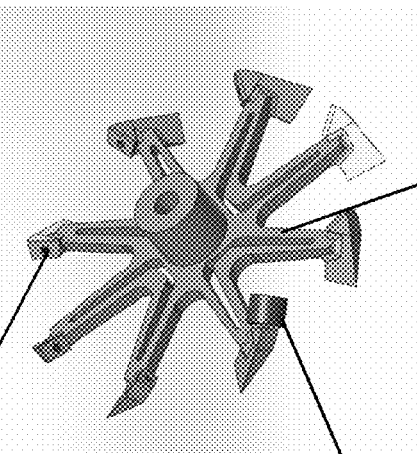
FIGS. 8A though 8C illustrates various frequencies of cutting tools in accordance with embodiments of the invention.
Figure 8B:
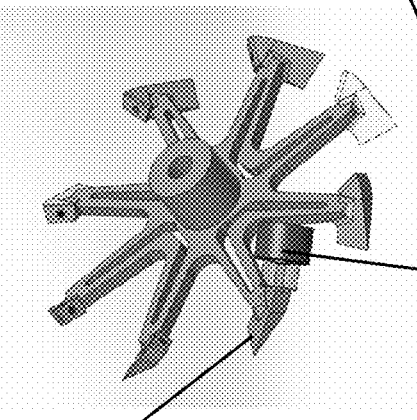
Figure 8A:
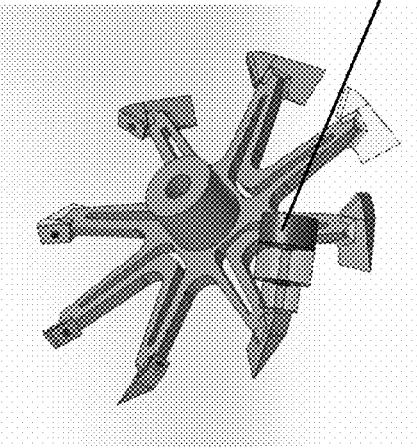

As described previously, many embodiments may be adapted to include some additional mass at the end of the support arms near the cutting element. In some embodiments the additional mass may be included in the support structure rather than a support arm. FIGS. 8A through 8C illustrate embodiments of a cutting tool 800 configured such that additional mass 802 can be added or removed. The additional mass 802 can vary in size and shape, thus generating a variety of resonance frequencies with respect to the compliant members 804 of the tool 800. For example, FIG. 8C illustrates a cutting tool 800 with a smaller mass that produces a higher frequency than the tool illustrated in FIG. 8A with a much larger mass in comparison. Additionally, FIG. 8B illustrates an embodiment with an additionally mass 802 that is larger than that illustrated in FIG. 8C and accordingly produces a frequency less than that of the smaller mass (FIG. 8C) but greater than that of the larger mass (FIG. 8A). Therefore, it can be appreciated that the larger the mass the lower the frequency but also the larger the movement in the compliant or flexible members 804 of the tool with respect to the resting plane. In some embodiments, the cutting element 806 can be adapted with a cavity 808 that is capable of receiving an additional mass component 802. In some embodiments, the cavity may be threaded such that connects with a corresponding thread on the additional mass. In some embodiments, the additional mass 802 may be adaptable to receive additional mass components in order to alter the resonance frequency of the tool.

Figure 9C:
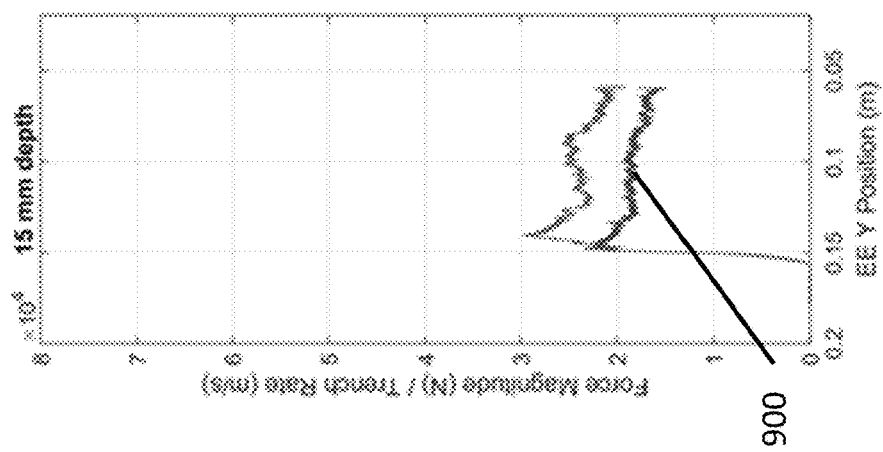
FIGS. 9A through 9C illustrate a comparison of cutting forces of a cutting tool in accordance with embodiments of the invention.
Figure 9B:
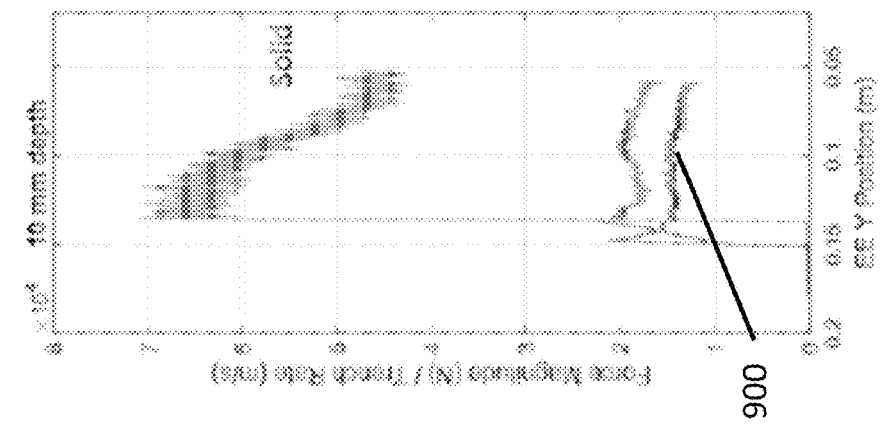
Figure 9A:
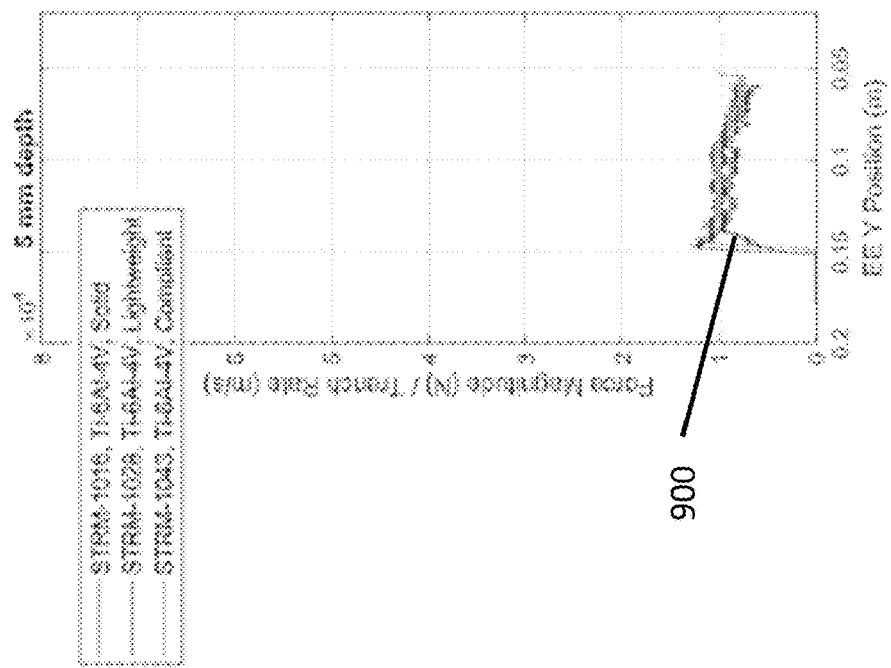

The combination of vibrational modes and the response of the cutting element with the material can result in reduced cutting forces being generated and subsequently prevent the cutting elements from becoming stuck in the material being cut. This can be illustrated by the graphs shown in FIGS. 9A through 9C. Each graph compares the cutting forces generated by three different cutting tools with similar shapes and designs. For example, one tool is a solid cutting blade, while a second tool is a lightweight cutting blade and the last one is a cutting tool according to embodiments. Each tool has the same number of cutting teeth positioned at the same location circumferentially on the tool. Each graph represents the cutting forces at different cutting depths for each of the tools. As can be shown in FIGS. 9A-9C the compliant tool 900, in accordance with embodiments, generates consistently lower cutting forces.

Figure 10:
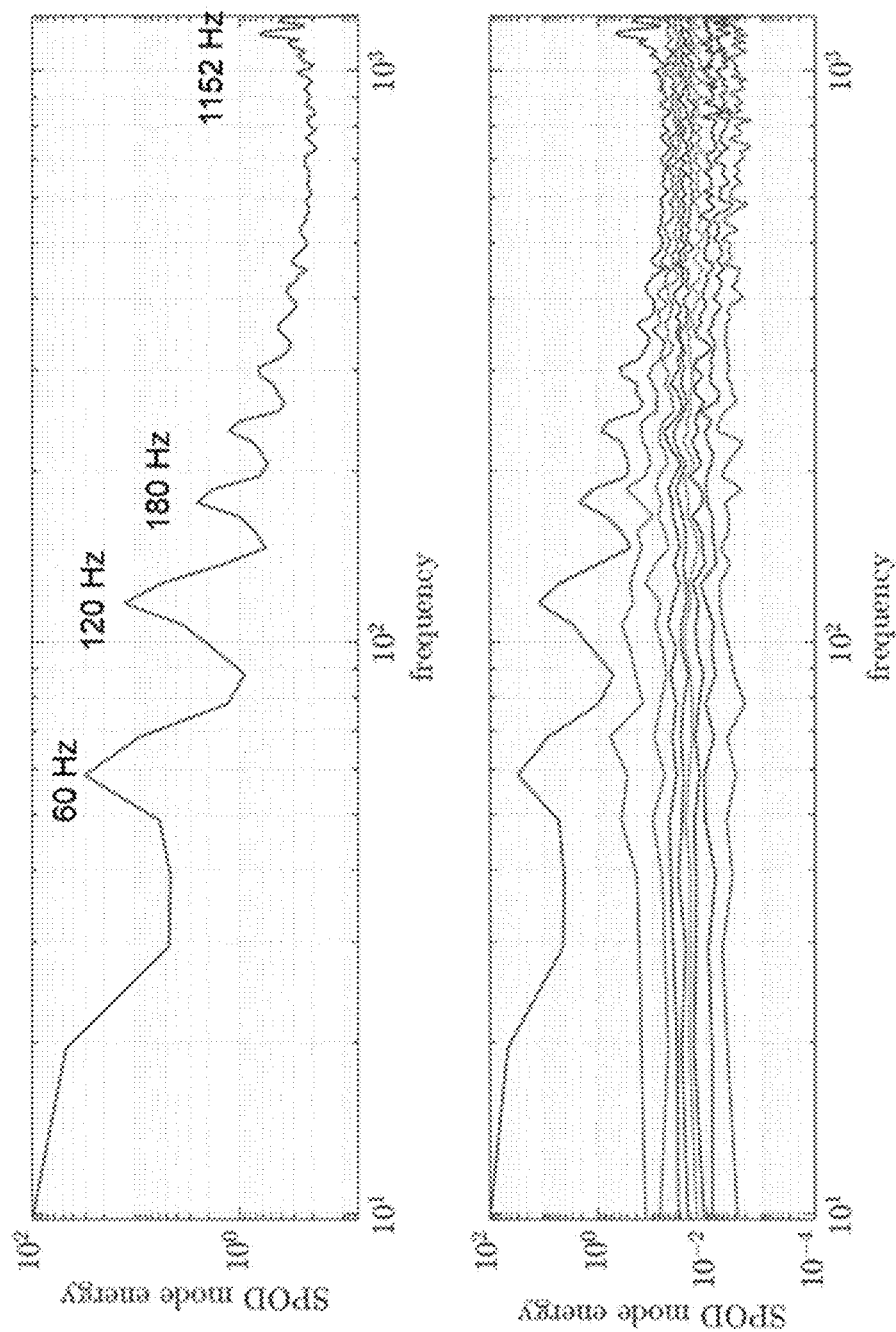
FIG. 10 is a graphical illustration of the location of resonance frequencies in accordance with embodiments of the invention.

Turning now to 10, the capabilities of various embodiments of cutting tools are illustrated. FIG. 10 provides a graphical illustration of the location of the resonance frequencies of embodiments of a cutting tool. As shown, in many embodiments, the Spectral Proper Orthogonal Decomposition (SPOD) mode energy can change in accordance with the rotational frequency of the cutting tool. Moreover, as described above the geometry and configuration of the tool can ultimately affect the resonance frequency of the tool and associated cutting elements on the tool. Therefore, it can be appreciated that a variety of tool designs can be used to achieve a number of different frequencies resulting in different cutting patterns for the different materials to be cut.

As described previously, the movement or flex or vibrational mode can vary based on the geometric design of the tool. Additionally, any number of motors can be used to generate the rotational frequency capable of activating the different rotational modes. As described previously, many embodiments have different geometric designs that have preferred patterns or vibrational modes in which they operate. The connected motor can therefore generate a rotational frequency that corresponds to the vibrational mode(s) of the cutting tool design(s) thereby activating one or more vibrational modes. Moreover, due to the vast number of operational frequencies that embodiments of the cutting tool may operate at, some embodiments may utilize the cutting tool as a sensor in conjunction with the cutting features. For example, as the support elements flex or bend during operation and accordingly generate stress or strain on the tool itself. Stress and strain are measurable properties and can be correlated to a number of material properties of the tool as well as the material being cut. Accordingly, the associated strain on the tool can be used to provide feedback to a user by connecting a strain gage or other measurement device to an output device such as a computer or other device with a user interface. Information obtained from the sensor feedback can be used for a number of different operations. For example, the sensor feedback can be used to analyze the material being cut, if it is unknown or new. In some embodiments, the sensors can be used as a guide to determine if the rotational speed of the motor needs to be adjusted to improve the cutting of the tool.

As can be appreciated from the description of embodiments of cutting tools, many embodiments of cutting tools can be used in a variety of industries and can be used on a variety of materials. For example, some embodiments of cutting tools may be adaptable for the mining industry in mining such things as ore or even for drilling industries such as drilling for oil, gas extraction, ore mining, rock cutting, construction, ice cutting, and/or machining. Accordingly, many embodiments may be adapted to cut through a variety of materials such as rock, dirt, metal, composites, sand, ice, oil sand, wood, concrete and/or any number liquids such as water and oil. For example, as illustrated in the figures, many embodiments may be configured to be a cutting tool like a drill bit or a coring and rock cutting bit. Other embodiments may be configured to be a saw blade.

As has been described throughout the description and illustrated in the figures, many embodiments of the cutting tool may have complex designs. For example, many embodiments may have spiraled elements or other complex design support elements that extend to the cutting elements. Additionally, many of the cutting elements and support structures, including the central shaft, may require more than one material for manufacturing to produce the desired cutting results from the tool. For example, some embodiments may use titanium or a titanium alloy or steel. Other embodiments may use tungsten-carbide, nickel-based alloys, metal matrix composites, carbide-reinforced allows, bulk metallic glass, amorphous metals, or any number of refractor metals such as tungsten, niobium, vanadium, and molybdenum.

The complexity of designs that may be produced may require the use of unconventional methods of producing such cutting tools. In some embodiments, additive manufacturing methods can be used to produce the highly complex designs needed. The advantages that additive manufacturing provides can be in the ability to produce thinner cross sections, spirals, as well as other complex designs with near perfect axial symmetry. Additionally, additive manufacturing can allow for the use of internal features such as passages or open sections to be produced within the tool itself that would otherwise not be possible through traditional machining and or forming processes. Such open sections or internal passages can allow for many embodiments to be used for an increased number of applications including testing materials, sensing materials, and/or transporting materials internally within the tool. Additionally, such internal passages can allow many embodiments to be adaptable for self-lubrication to help improve the tool longevity.

In accordance with many embodiments, cutting tools may be produced in an number of ways including additive manufacturing as well as traditional machining and/or forming. In some embodiments, the cutting tools may be heat treated post machining or manufacturing to improve the cutting tool's overall strength. It can be appreciated that heat treating may not be restricted to a certain type or process but can vary based on the tool design, composition, and desired final product. Additionally, many embodiments may incorporate one or more coatings applied to the cutting surface or the entire tool. Coatings, can help improve the tool use life by strengthening the cutting surface and/or tool itself. It can be appreciated that any number of suitable coatings can be used.

DOCTRINE OF EQUIVALENTS

As can be inferred from the above discussion, the above-mentioned concepts can be implemented in a variety of arrangements in accordance with embodiments of the invention. Specifically, many embodiments include a cutting tool with flexible support elements to support a cutting element such that the cutting element can move in and out of a plane in accordance with the rotational frequency of the tool. Moreover, many embodiments capitalize on the unique properties and design of a lattice structure to allow for more unconventional yet packaging efficient fuel storage systems. Achieving such functionality, according to embodiments, involves the implementation of special arrangements/designs between subsystems described above, and their equivalents.

Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A cutting tool comprising:
   a centralized shaft having a central axis with a first end and a second end wherein the first end is configured to connect to a rotational element such that the cutting tool is rotatable about the central axis at a rotational frequency;
   a plurality of resiliently compliant support element connected to the centralized shaft wherein the resiliently compliant support element moves in correlation to the rotational frequency at a preferred resonance frequency, wherein each of the plurality of resiliently compliant support elements extend radially outward from the central axis such that they are elongated elements having a first portion connected to the centralized shaft and a second portion, and wherein each of the plurality of resiliently compliant support elements rest in a resting plane when not rotating and where each of the plurality of resiliently compliant support elements flex out of plane when rotating; and;
   a plurality of cutting elements wherein each of the plurality of cutting elements corresponds to at least one of the plurality of resiliently compliant support elements and is connected to the second portion thereof, wherein the cutting element produces a hammering effect as a result of movement from the resiliently compliant support element.

2. The cutting tool of claim 1, wherein each of the plurality of resiliently compliant support elements comprises a secondary flex element interconnected between at least two of the cutting elements.

3. The cutting tool of claim 2, wherein the secondary flex element is selected from a group of shapes consisting of, "V" shaped, "U" shaped, and straight.

4. The cutting tool of claim 1, wherein the cutting tool is manufactured from a material selected from a group consisting of steel, titanium, composite, nickel-based alloy, metal matrix composite, carbide-reinforced alloy, bulk metallic glass, amorphous metal, tungsten, niobium, vanadium, and molybdenum.

5. The cutting tool of claim 1, wherein the elongated shaft has a bore hole that extends through the shaft running along the central axis from the first end to the second end.

6. The cutting tool of claim 1, wherein the cutting tool is selected from a group consisting of saw blade, coring blade, rock drilling bit, and a chainsaw.

7. The cutting tool of claim 1, wherein the resiliently compliant support element has a vibrational mode based on the geometry of the tool.

8. The cutting tool of claim 7, wherein the vibrational mode is a traveling wave pattern.

9. The cutting tool of claim 7, wherein the vibrational mode is an arched cross sectional pattern.

10. The cutting tool of claim 7, wherein the vibrational mode is a traveling wave pattern.

11. The cutting tool of claim 7, wherein the vibrational mode is a V-shaped cross sectional pattern.

12. The cutting tool of claim 7, wherein the vibrational mode is a horizontal plane cross sectional pattern.

13. The cutting tool of claim 7, wherein the vibrational mode is angled wave cross sectional pattern.

14. The cutting tool of claim 1, wherein the cutting tool is a self-hammering cutting tool.

15. The cutting tool of claim 1, wherein the cutting element is made from a metal matrix composite.

16. The cutting tool of claim 1, further comprising a strain gage disposed on resiliently compliant support element and electronically connected to an output device wherein an applied force on the resiliently compliant support element will generate a strain or stress signal, and wherein the strain or stress signal is transmitted from the strain gage to the output device.

17. The cutting tool of claim 1, wherein the tool is adapted to cut through a material selected from a group consisting of rock, dirt, oil, oil sands, wood, ice, metal, ice and rock, cement, and composite.

18. The cutting tool of claim 1, wherein the tool is adapted for use in an industry selected from a group consisting of mining, oil extraction, gas extraction, ore mining, rock cutting, construction, ice cutting, and machining.

19. The cutting tool of claim 1, wherein the cutting tool is produced using additive manufacturing.

20. The cutting tool of claim 19, wherein the cutting tool is heat treated after manufacturing to strengthen the tool.

21. The cutting tool of claim 1, further comprising a coating on a cutting surface of the cutting element wherein the coating provides an additional hardening element to the surface of the cutting element.

22. The cutting tool of claim 1, further comprising an additional mass connected to a portion of the cutting element, wherein the additional mass operates to alter the preferred resonance frequency of the tool.

23. The cutting tool of claim 22, wherein the additional mass is a carbide bit.

* * * * *

UNITED STATES PATENT AND TRADEMARK OFFICE
CERTIFICATE OF CORRECTION

PATENT NO. : 11,400,613 B2  
APPLICATION NO. : 16/806799  
DATED : August 2, 2022  
INVENTOR(S) : Douglas C. Hofmann et al.

Page 1 of 1

It is certified that error appears in the above-identified patent and that said Letters Patent is hereby corrected as shown below:

On the Title Page

Column 1, under item (72) Inventors, please add as 7th Inventor:
-- Luis Phillipe Tosi, Pasadena, CA (US) --

Signed and Sealed this
Sixth Day of June, 2023

Katherine Kelly Vidal
*Director of the United States Patent and Trademark Office*